US011902749B2

(12) United States Patent
Klemmensen

(10) Patent No.: US 11,902,749 B2
(45) Date of Patent: Feb. 13, 2024

(54) HEARING AID SYSTEM WITH INTERNET PROTOCOL

(71) Applicant: Oticon A/S, Smørum (DK)

(72) Inventor: Bjarne Klemmensen, Smørum (DK)

(73) Assignee: Oticon A/S, Smørum (DK)

( * ) Notice: Subject to any disclaimer, the term of this patent is extended or adjusted under 35 U.S.C. 154(b) by 0 days.

(21) Appl. No.: 18/084,273

(22) Filed: Dec. 19, 2022

(65) Prior Publication Data

US 2023/0120316 A1 Apr. 20, 2023

Related U.S. Application Data

(63) Continuation of application No. 17/336,549, filed on Jun. 2, 2021, now Pat. No. 11,564,047.

(30) Foreign Application Priority Data

Jun. 2, 2020 (EP) .................................... 20177809

(51) Int. Cl.
*H04R 25/00* (2006.01)

(52) U.S. Cl.
CPC ......... *H04R 25/558* (2013.01); *H04R 25/507* (2013.01); *H04R 25/552* (2013.01); *H04R 2225/55* (2013.01)

(58) Field of Classification Search
CPC ......................... H04R 2225/55; H04R 25/507; H04R 25/552; H04R 25/558; H04R 25/554
USPC .......................................................... 381/315
See application file for complete search history.

(56) References Cited

U.S. PATENT DOCUMENTS

| | | | | |
|---|---|---|---|---|
| 4,207,441 | A | 8/1980 | Ricard et al. | |
| 4,532,930 | A | 8/1985 | Crosby et al. | |
| 2003/0138109 | A1 | 7/2003 | Bindner et al. | |
| 2014/0211973 | A1 | 7/2014 | Wang et al. | |
| 2015/0365999 | A1* | 12/2015 | Lee | H04W 4/80 381/315 |
| 2016/0241973 | A1 | 8/2016 | Murray et al. | |
| 2017/0180886 | A1* | 6/2017 | Van Der Loo | H04R 25/554 |
| 2017/0318400 | A1 | 11/2017 | Westermann et al. | |
| 2017/0323073 | A1 | 11/2017 | Westermann et al. | |
| 2019/0191255 | A1 | 8/2019 | Maretti et al. | |
| 2021/0099812 | A1 | 4/2021 | Dickmann et al. | |

FOREIGN PATENT DOCUMENTS

| | | | |
|---|---|---|---|
| EP | 2 015 603 | A1 | 1/2009 |
| WO | WO2010008861 | A2 | 1/2010 |

OTHER PUBLICATIONS

Anonymous, "Keysight Solutions for Iot and M2M, Internet of Things—IoT", Aug. 13, 2015, XP055737278, https://www.keysight.com/upload/cmc_upload/All/06_IoT_M2M, [retrieved on Oct. 6, 2020], pp. 1-42.

(Continued)

*Primary Examiner* — Phylesha Dabney
(74) *Attorney, Agent, or Firm* — Birch, Stewart, Kolasch & Birch, LLP

(57) ABSTRACT

A hearing aid system comprising at least a first hearing aid, wherein the first hearing aid is configured to establish a communication link over the internet with a remote entity based on a protocol stack, wherein the protocol stack includes an internet protocol, and the protocol stack is implemented in the first hearing aid.

20 Claims, 19 Drawing Sheets

(56) References Cited

OTHER PUBLICATIONS

Dugand., "CEVA's Bluetooth Smart 4.2 IP is Now Fully Qualified by the Bluetooth SIG!", CEVA's Experts Blog, Aug. 18, 2015, pp. 1-6.
Extended European Search Report for European Application No. 21175261.3, dated Feb. 10, 2022.
Kachler, "Hörgerät mit eindeutiger Adresse—Hearing instrument with unique identifyer", ip.com, ip.com Inc., West Henrietta, NY, Jul. 23, 2003, XP013011734, ISSN: 1533-0001, total 1 page.
Shirvanimoghaddam et al., "Paving the Path to a Green and Self-Powered Internet of Things", arxiv.org, Cornell University Library, 201 Olin Library Cornell University Ithaca, NY, 14853, Dec. 4, 2017, XP080845332, pp. 1-24.

* cited by examiner

HEARING AID SYSTEM WITH INTERNET PROTOCOL

CROSS REFERENCE TO RELATED APPLICATIONS

This application is a Continuation of co-pending application Ser. No. 17/336,549, filed on Jun. 2, 2021, which claims priority under 35 U.S.C. § 119(a) to European Patent Application No. EP 20177809.9 filed on Jun. 2, 2020. Each of the above applications is hereby expressly incorporated by reference, in its entirety, into the present application.

FIELD OF THE DISCLOSURE

The present disclosure relates to the field of hearing aid systems. More particularly, the disclosure relates to the exchange of data of a hearing aid system with a remote entity and the protocols used for such a data exchange.

BACKGROUND

Presently, in order to communicate between a hearing aid system and a remote server such as for the purpose of fitting a hearing aid, for provision or collection of data, for firmware updates of the hearing aid system, for streaming audio content etc. a local auxiliary user device (such as a smart phone, tablet or personal computer) with a special piece of (typically proprietary or vendor specific) software provided by the hearing aid vendor is required. This device or software is connected to the hearing instrument either directly or via gateway(s). In such systems, the wireless technology standard used for locally connecting the auxiliary device to the hearing aid system is typically either Bluetooth (BT) or Bluetooth Low Energy (Bluetooth LE) in connection with an Asynchronous Connection-Less (ACL) protocol for a transmission link. The communication between the auxiliary user device and the remote server is then based on an Internet Protocol, such as version 4 (IPv4) or version 6 (IPv6).

While, the approach described above has the advantage, that the connection established by the hearing aid system (Bluetooth or Bluetooth LE) only requires little power as such devices are typically battery power devices. However, such a system has the drawback, that a local auxiliary user device is always required and that moreover a specific software has to be installed on that device in order to serve as a translator device between the hearing aid system and the remote server.

Therefore, there is a need to provide a solution that addresses at least some of the above-mentioned drawbacks. Specifically, there is a need to provide a solution that allows for a low energy connection to the hearing aid system but at the same time allows for a higher degree of flexibility when connecting to a remote entity, such as a remote server.

SUMMARY

According to a first exemplary aspect a hearing aid system, comprising at least a first hearing aid is disclosed. The first hearing aid may be configured to establish a communication link over the internet with a remote entity based on a protocol stack. The protocol stack may include a combination of an internet protocol and a Bluetooth based protocol, and the protocol stack may be implemented in the first hearing aid.

The combination of having an internet protocol in

The components of the hearing aid system or the respective hearing aid for realizing the above functions may generally be implemented in hardware and/or software. The hearing aid system or the respective hearing aid may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the hearing aid system or hearing aid may comprise for instance one or more processing units or processors.

In one example, the hearing aid system and specifically a respective hearing aid may comprising at least one processor and at least one memory including computer program code, the at least one memory and the computer program code being configured to, with the at least one processor, cause the hearing aid system at least to perform and/or to control the respective functions. The hearing aid system may, however, also comprise one or more additional components.

According to a second exemplary aspect, a system is disclosed, the system comprising the hearing aid system according to the first aspect and the remote entity.

According to a third exemplary aspect, a method performed by at least a first hearing aid of a hearing aid system is disclosed. The hearing system may in particular be a hearing aid system according to the first aspect. The method may comprise establishing a communication link over the internet with a remote entity based on a protocol stack. The protocol stack may include an internet protocol and the protocol stack may be implemented in the first hearing aid.

As indicated, the method may for instance be performed and/or controlled by the first hearing aid of a hearing aid system. However, and as will be explained in more detail below, the method may further be performed by further devices of the hearing system and/or by further device such remote entities, such as a server or a server cloud for instance, the devices together performing the method.

According to a fourth exemplary aspect, a computer program code is disclosed, the computer program code, when executed by a processor, causing an apparatus to perform and/or control the actions of the method according to the third aspect.

The computer program may be stored on computer-readable storage medium, in particular a tangible and/or non-transitory medium. The computer readable storage medium could for example be a memory or the like. The computer program may be stored in the computer readable storage medium in the form of instructions encoding the computer-readable storage medium. The computer readable storage medium may be intended for taking part in the operation of a device, like an internal or external memory, for instance a Read-Only Memory (ROM), a Random Access Memory (RAM) or a hard disk of a computer, or be intended for distribution of the program, like an optical disc.

According to a fifth exemplary aspect, a non-transitory computer readable storage medium is disclosed, in which computer program code is stored, the computer program code when executed by a processor causing at least one apparatus to perform the method according to the third aspect. The computer readable medium includes computer storage media adapted to store a computer program comprising program codes, which when run on a processing system causes the data processing system to perform at least some (such as a majority or all) of the steps of the method described herein and in the claims.

By way of example, and not limitation, such computer-readable media can comprise RAM, ROM, and/or EEPROM, or any other medium that can be used to carry or store desired program code in the form of instructions or data structures and that can be accessed by a computer. Combinations of the above should also be included within the scope of computer-readable media. In addition to being stored on a tangible medium, the computer program can also be transmitted via a transmission medium such as a wired or wireless link or a network, e.g. the Internet, and loaded into a data processing system for being executed at a location different from that of the tangible medium.

In the following, further exemplary features of all aspects of the present invention will be described in more detail.

A hearing aid system may generally be understood or include a hearing aid (which may also be termed a hearing device, a hearing instrument or a hearing assistance device) that is adapted to improve or augment the hearing capability of a user by receiving an acoustic signal from a user's surroundings, generating a corresponding audio signal, possibly modifying the audio signal and providing the possibly modified audio signal as an audible signal to at least one of the user's ears. 'Improving or augmenting the hearing capability of a user' may include compensating for an individual user's specific hearing loss. The "hearing aid" may further refer to a device such as a hearable, an earphone or a headset adapted to receive an audio signal electronically, possibly modifying the audio signal and providing the possibly modified audio signals as an audible signal to at least one of the user's ears. Such audible signals may be provided in the form of an acoustic signal radiated into the user's outer ear, or an acoustic signal transferred as mechanical vibrations to the user's inner ears through bone structure of the user's head and/or through parts of the middle ear of the user or electric signals transferred directly or indirectly to the cochlear nerve and/or to the auditory cortex of the user.

The hearing aid of the hearing system is adapted to be worn in any known way. This may include i) arranging a unit of the hearing system behind the ear with a tube leading air-borne acoustic signals into the ear canal or with a receiver/loudspeaker arranged close to or in the ear canal and connected by conductive wires (or wirelessly) to the unit behind the ear, such as in a Behind-the-Ear type hearing aid, and/or ii) arranging the hearing aid entirely or partly in the pinna and/or in the ear canal of the user such as in an In-the-Ear type hearing aid or In-the-Canal/Completely-in-Canal type hearing aid, or iii) arranging a unit of the hearing aid attached to a fixture implanted into the skull bone such as in a Bone Anchored Hearing Aid or a Cochlear Implant, or iv) arranging a unit of the hearing aid as an entirely or partly implanted unit such as in a Bone Anchored Hearing Aid or a Cochlear Implant. The hearing aid may be implemented in one single unit (housing) or in a number of units individually connected to each other.

Typically, a "hearing aid system" refers to a system comprising one or two hearing aids, and a "binaural hearing aid system" refers to a system comprising two hearing aids where the individual hearing aids are adapted to cooperatively provide audible signals to both of the user's ears. The hearing aid system or binaural hearing aid system may further include one or more auxiliary device(s) that communicates with at least one hearing aid, the auxiliary device affecting the operation of the hearing aids and/or benefitting from the functioning of the hearing aids. A wired or wireless communication link between the at least one hearing aid and the auxiliary device is established that allows for exchanging information (e.g. control and status signals, possibly audio signals) between the at least one hearing aid and the auxiliary device. Such auxiliary devices may include at least one of a remote control, a remote microphone, an audio gateway device, a wireless communication device, e.g. a mobile phone (such as a smartphone), a tablet or another device, e.g. comprising a graphical interface, a public-address system, a car audio system, a music player, or a combination thereof. Particularly in case of an audio gateway, the device may be adapted to receive a multitude of audio signals such as from an entertainment device like a TV or a music player, a telephone apparatus like a mobile telephone or a computer, e.g. a PC. The auxiliary device may further be adapted to (e.g. allow a user to) select and/or combine an appropriate one of the received audio signals (or combination of signals) for transmission to the at least one hearing aid. In particular in case of a remote control, the auxiliary device may be adapted to control functionality and/or operation of the at least one hearing aid. The function of the remote control may also be implemented in a smartphone or other (e.g. portable) electronic device, the smartphone/electronic device possibly running an application (APP) that controls functionality of the at least one hearing aid.

In case the hearing aid system comprises one or more auxiliary device(s), the communication link from the hearing aid system to the remote entity may be established from the hearing aid of the hearing aid system via the (e.g. local) auxiliary device and over the internet to the remote entity.

In general, a hearing aid may in particular include i) an input unit such as a microphone for receiving an acoustic signal from a user's surroundings and providing a corresponding input audio signal, and/or ii) a receiving unit for electronically receiving an input audio signal. The hearing aid may further include a signal processing unit for processing the input audio signal and an output unit for providing an audible signal to the user in dependence on the processed audio signal.

The input unit may include multiple input microphones, e.g. for providing direction-dependent audio signal processing. Such directional microphone system is adapted to (relatively) enhance a target acoustic source among a multitude of acoustic sources in the user's environment and/or to attenuate other sources (e.g. noise). In one aspect, the directional system is adapted to detect (such as adaptively detect) from which direction a particular part of the microphone signal originates. This may be achieved by using conventionally known methods. The signal processing unit may include an amplifier that is adapted to apply a frequency dependent gain to the input audio signal. The signal processing unit may further be adapted to provide other relevant functionality such as compression, noise reduction, etc. The output unit may include an output transducer such as a loudspeaker/receiver for providing an air-borne acoustic signal transcutaneously or percutaneously to the skull bone or a vibrator for providing a structure-borne or liquid-borne acoustic signal. In some hearing aids, the output unit may include one or more output electrodes for providing the electric signals such as in a Cochlear Implant.

Such a Cochlear Implant may include i) an external part for picking up and processing sound from the environment, and for determining sequences of pulses for stimulation of the electrodes in dependence on the current input sound, ii) a (typically wireless, e.g. inductive) communication link for simultaneously transmitting information about the stimulation sequences and for transferring energy to iii) an implanted part allowing the stimulation to be generated and applied to a number of electrodes, which are implantable in different locations of the cochlea allowing a stimulation of different frequencies of the audible range. Such systems are e.g. described in U.S. Pat. No. 4,207,441 and in U.S. Pat. No. 4,532,930.

In one example, a hearing aid comprises a multi-electrode array e.g. in the form of a carrier comprising a multitude of electrodes adapted for being located in the cochlea in proximity of an auditory nerve of the user. The carrier is preferably made of a flexible material to allow proper positioning of the electrodes in the cochlea such that the electrodes may be inserted in cochlea of a recipient. Preferably, the individual electrodes are spatially distributed along the length of the carrier to provide a corresponding spatial distribution along the cochlear nerve in cochlea when the carrier is inserted in cochlea.

That the hearing aid is configured to establish a communication link over the internet may generally be understood to mean that the hearing aid can establish a telecommunication link over a telecommunication network. Therein, a link may be understood to be or comprise a communication channel that connects two or more devices (i.e. the hearing aid and the remote entity) for the purpose of data transmission. The link may be a dedicated physical link or a virtual circuit that uses one or more physical links or shares a physical link with other telecommunications links. The link may be based on one of several types of information transmission paths such as those provided by communication satellites, terrestrial radio communications infrastructure and computer networks to connect two or more points. A link may in particular be understood to connect nodes of a network. The link may in particular be understood to be or comprise a logical link. For instance, the link may be data link, an uplink, a downlink and/or a point-to-point link. A point-to-point link is in particular understood to be a dedicated link that connects two communication points (e.g. two nodes od a network).

That the communication link over the internet is established with a remote entity is understood to mean that the communication link is established with at least one remote entity. The remote entity (or the remote entities) may in particular be or comprise a server, multiple (e.g. distributed) servers, such as a computer cloud, for instance. The remote entity may in particular be controlled and/or operated by the hearing aid vendor.

A protocol stack is in particular understood to refer to an implementation of a computer networking protocol suite or family. The protocol stack may in particular be a protocol stack (at least in part) according to the Internet Protocol Suite and/or the Open Systems Interconnection model (OSI model).

The Internet protocol suite is the conceptual model and set of communications protocols used in the Internet and similar computer networks. It is commonly known as TCP/IP because of the two foundational protocols Transmission Control Protocol (TCP) and the Internet Protocol (IP) in the suite, or User Datagram Protocol (UDP), Real-Time Transport protocol (RTP). The Internet protocol suite provides end-to-end data communication specifying how data should be packetized, addressed, transmitted, routed, and received. This functionality is basically organized into four abstraction layers, which classify related protocols according to the scope of networking involved.

The OSI model is a conceptual model that characterizes and standardizes the communication functions of a telecommunication or computing system without regard to its underlying internal structure and technology. According to the model, a communication system may be partitioned into seven abstraction layers. The original version of the model had seven layers. Generally, a layer serves the layer above it and is served by the layer below it. For example, a layer that provides error-free communications across a network provides the path needed by applications above it, while it calls the next lower layer to send and receive packets that constitute the contents of that path.

The protocol stack may (at least) include an internet protocol. An internet protocol (IP) may be understood to be a protocol of the internet layer of the TCP/IP model. An internet protocol may be the principal communications protocol in the Internet protocol suite for relaying datagrams across network boundaries. Its routing function enables internetworking, and essentially establishes the Internet. The internet protocol may have the task of delivering packets from the source host to the destination host solely based on the IP addresses in the packet headers. For this purpose, an internet protocol defines packet structures that encapsulate the data to be delivered. It also defines addressing methods that are used to label the datagram with source and destination information.

A datagram may be a self-contained, independent entity of data carrying sufficient information to be routed from a source to a destination computer without reliance on earlier exchanges between this source and destination computer and the transporting network The internet protocol may in particular be the Internet Protocol Version 4 (IPv4) or its successor the Internet Protocol Version 6 (IPv6). However, generally the internet protocol may be also be any other version and in particular future version of the Internet Protocol.

As will be explained in more detail below, the protocol stack may and typically does also comprise further layers and/or protocols.

That the protocol stack is implemented in a hearing aid is understood to mean that the hearing aid itself utilizes the protocol stack and therewith the internet protocol. In other words, the hearing aid is able to work according to the internet protocol and is for instance able to handle (e.g. generate and/or decode) data packets (e.g. by encapsulating and/or extracting data to be delivered/received) according to the packet structure of the internet protocol.

Providing a hearing aid, which is configured to establish a communication link over the internet with a remote entity based on a protocol stack, wherein the protocol stack includes an internet protocol, and the protocol stack is implemented in the first hearing aid, allows for a communication link between the hearing aid and the remote entity without the need for a vendor specific application or software on an auxiliary device. While an auxiliary device may still be used, it is not necessary for the device to have such a software installed. An auxiliary user device, such as a smartphone or computer, may not even necessary in certain embodiments and the hearing aid may directly communicate with a router for instance.

The communication link between the first hearing aid and the remote entity over the internet may thus considered to be a direct internet protocol link to the remote entity. For this, both the remote entity and the hearing aid may comprise a layer of a protocol stack which implements an internet protocol and thus allows an exchange of data packets according to the internet protocol.

The communication link between the first hearing aid and the remote entity over the internet may be established via an internet service provider. Accordingly, the communication between the hearing aid and the internet service provider may likewise be based on a protocol stack including an internet protocol. As explained above, a direct IP link may thus be established from the hearing aid via the internet service provider to the remote entity.

The communication link between the first hearing aid and the remote entity over the internet may be an end-to-end internet protocol link. This may in particular be understood to mean that application-specific features reside in the communicating end nodes of the network (i.e. the hearing aid and the remote entity), rather than in intermediary nodes, such as gateways and routers, that exist to establish the network.

As already mentioned, the internet protocol may in particular be the Internet Protocol Version 4, IPv4 or the Internet Protocol Version 6, IPv6 or any future version of the Internet Protocol. The first major version of the internet protocol, Internet Protocol Version 4 (IPv4), is presently still the dominant protocol of the Internet. Its successor is Internet Protocol Version 6 (IPv6), which has been in increasing deployment on the public Internet since the last years.

The internet protocol stack may comprise an application layer. Generally, the application layer may contain the communication protocols and interface methods used in process-to-process communications across the internet protocol computer network. The application layer may standardize communication and depend upon the underlying transport layer protocols to establish host-to-host data transfer channels and manage the data exchange in a client-server or peer-to-peer networks. Example protocols of this layer (in the TC/IP model) are FTP, HTTP or HTTPS, IMAP, SMTP, SSH, TLS/SSL, for instance. The application layer may thus inter alia be considered as being responsible for dealing with user data and/or control data, for instance audio data, encoded audio data, audio control data and/or non-audio data.

The internet protocol stack may comprise a transport layer. The protocols of this layer provide (in the IP model) host-to-host, broadcast and/or multi-cast communication services for applications. It may provide services such as connection-oriented communication, reliability, flow control, and multiplexing. Example protocols of this layer are TCP and UDP, for instance. The transport layer may thus in particular be considered as being responsible for establishing a connection between the first hearing aid and the remote entity.

The connection may be an IP connection or an IP link between the first hearing aid and the remote entity.

The internet protocol stack may comprise a network layer comprising the internet protocol. The network layer my in particular be an internet layer (in the TCP/IP model). The internet layer is typically used to transport network packets from the originating host across network boundaries, if necessary, to the destination host (generally specified by an IP address). Example protocols of this layer and embodiments of the internet protocol are the already mentioned IPv4 or IPv6. Thus, the network or internet layer may in particular be considered for being responsible for connecting the first hearing aid and the remote entity.

The internet protocol stack may comprise a data link layer. The link layer may comprise the group of methods and communications protocols confined to the link that a host is physically connected to. The link layer may define the methods and standards that operate only between adjacent network nodes of a network segment. The data link layer may comprise sublayers such as LLC or MAC. Thus, the data link layer may in particular be responsible for formatting data received or to be transmitted via a physical communication medium.

The internet protocol stack may comprise a physical layer, in particular for transmitting and/or receiving data over a physical communication medium. The physical layer may be implemented by a PHY chip, for instance. The physical layer in particular consists of the electronic circuit transmission technologies of a network. It is a fundamental layer underlying the higher level functions in a network, and can be implemented through different hardware technologies. The physical layer can in particular define the means of transmitting raw bits over a physical data link connecting network nodes. For instance, the bitstream may be grouped into code words or symbols and converted to a physical signal that is transmitted over a transmission medium. The physical layer can be considered as providing an electrical, mechanical, and procedural interface to the transmission medium.

The protocol stack may comprise or be based on a so-called Bluetooth network encapsulation protocol, BNEP. A Bluetooth Network Encapsulation Protocol (BNEP) is understood to be a protocol encapsulating packets from one or more (e.g. various) other networking protocols into the Bluetooth data link layer, which can then be transported directly over the Bluetooth protocol, e.g. by utilizing the Bluetooth Logical Link Control and Adaptation Layer Protocol (L2CAP) protocol. L2CAP can provide a data link layer for Bluetooth. Specifically, BNEP may remove and replace the Ethernet Header with an BNEP Header. However, this allows the Ethernet Payload to remain unchanged. Finally, both the BNEP Header and the Ethernet Payload can be encapsulated by L2CAP and may be sent over the Bluetooth media.

The protocol stack may comprise or be based on an Internet Bluetooth Support Profile, IPSP, such as Internet Protocol version 6 (IPv6) over Bluetooth® Low Energy (6LoBTLE) or any later versions of the Internet Protocol over Bluetooth® Low Energy. The Internet Protocol Support Profile (IPSP) allows devices to discover and communicate to other devices that support IPSP, e.g. an auxiliary user device, such as a smartphone or a IPSP router. The communication between the devices that support IPSP may be done using IPv6 packets over the Bluetooth Low Energy transport. Therein, the Internet Protocol Support Service (IPSS), the Generic Attribute Profile (GATT) and the Attribute Protocol (ATT) may be used only for service discovery, while the Generic Access Profile (GAP) can be used for device discovery and connection setup.

The above two approaches allow the use of the widely supported and implemented low energy transmission technologies such as the Bluetooth or Bluetooth LE standard for transmitting data, while at the same time an internet protocol and thus a direct IP link from the hearing aid to the remote entity can be realized.

The protocol stack may comprise or be based on a wireless local area network protocol, WLAN, according to the IEEE 802.11 standards. This technology has the advantage that it is also widely supported and implemented in many devices and routers.

In order to provide a particular power efficient approach, the protocol stack may further comprise or be based on a low power wide area network (LPWAN), protocol. An LPWAN is generally designed to allow long-range communications at a low bit rate among connected (and typically battery-powered) objects. The low power, low bit rate and intended use distinguish this type of network from a wireless WAN that is designed to connect users or businesses, and carry more data, using more power. In an example, the LPWAN data rate may range from 0.3 kbit/s to 50 kbit/s per channel.

Specifically, as explained above, the protocol stack may in particular comprises a protocol (such as BNEP, 6LOBTLE, 6LOWPAN, RFC 7668-IPv6 over Bluetooth® Low Energy) configured for removing the (IP/Ethernet) header of an IP data packet processed by the internet protocol and/or for encapsulating an IP data packet processed by the internet protocol.

While a data link layer and/or a physical layer of the protocol stack may be based on a wireless local area network protocol, WLAN, according to the IEEE 802.11 standards, the data link layer and/or a physical layer of the protocol stack may alternatively be based on a Bluetooth or Bluetooth LE protocol, a wireless personal area network protocol, WPAN, according to the IEEE 802.15 standards, a low power wide area network, LPWAN, protocol and/or an ultra-wide band protocol, UWB, according to the IEEE802.15.4a standard.

The first hearing aid may be configured for receiving a stream of audio from the remote entity over the communication link. For instance, a remote server may stream music or other audio directly to the hearing aids. Additionally or alternatively, it may also be the case that the hearing aids send a stream of audio to the remote entity over the communication link (e.g. for control command or in a two-way session).

The first hearing aid may be configured for receiving fitting data from the remote entity over the communication link. Since today's hearing aids can often be remotely fitted via a wireless connection. However, if the hearing aid now supports an internet protocol such as IPv4 or IPv6 and a bearer such as Bluetooth, then any device (phone/tablet/pc) which can operate as an IP boarder router and with a bearer compatible with the bearer supported by the hearing aid can be used as the fitting device without the need for any dedicated device or dedicated software.

The first hearing aid may be configured for receiving firmware updates from the remote entity over the communication link. The above advantages also apply for the case of a device firmware update (DFU).

The first hearing aid may be configured for transmitting sensor data recorded at the hearing aid system to the remote entity over the communication link. Examples of such sensors are microphones, heart rate sensors, Electroencephalography (EEG) sensors or the like. The sensor data may be first stored (e.g. in a non-volatile memory) at the hearing aid system or be sent to the remote entity directly after recordal.

The first hearing aid may be configured for receiving and/or transmitting optimization data for a neural network over the communication link. The optimization data may be or comprise audio data representing spoken commands of the user or listening audio recorded from the environment, for instance.

The first hearing aid may be configured receiving and/or transmitting of IFTTT data over the communication link.

IFTTT (If this then that) is a programming conditional statement that allows programming of the first hearing aid and/or other devices to response to events.

Depending on the type of data sent and/or received over the communication link, the protocol stack and in particular the application layer may be adapted accordingly in order to be able to process respective data.

The hearing aid system may further comprise at least a second hearing aid, wherein the first hearing aid and the second hearing aid are configured for communicating with one another. The first and second hearing aid may in particular be configured for exchanging data of the types mentioned above, e.g. audio data, fitting data, sensor data, optimization data or the like. The communication between the first and the second hearing aid may be realized by technologies already mentioned above, such as Bluetooth, Bluetooth LE or another proprietary RF or magnetic link.

At least one hearing aid may be configured for relaying data received over the communication link from the remote entity to the respective other hearing aid and/or for relaying data received from the respective other hearing aid over the communication link to the remote entity. This has the advantage that only one of the hearing aids needs to be in a coverage area of a respective auxiliary device, access point or router. Also, this may allow for only at one of the hearing aids to require an implementation of a protocol stack including an internet protocol, and for allowing a hearing aid to be connected to an access point or a router.

The system according to the second aspect may further comprise a portable or stationary auxiliary device local to the hearing aid system, providing routing functionality for the communication link between the first hearing aid (and optionally the second hearing aid) and the remote entity. As already described, the portable or stationary device may be a smartphone, tablet, computer or router, for instance. However, in contrast to the prior art, the auxiliary device does not require any vendor specific software in order to provide the routing functionality for the communication link. Rather, the auxiliary device only needs to support the protocols used by the hearing aid for establishing the internet protocol link.

For instance, in a preferred approach, the protocol stack, such as the 6LoBTLE/6LoWPAN adaptation layer, at the hearing aid may be configured for removing the IP header of respective IP packets generated by the internet protocol at the hearing aid and replace it with another header for transmitting the data to the auxiliary device (e.g. via the Bluetooth or Bluetooth LE standard). The auxiliary device may then provide an IP header and forward the respective data based on the internet protocol to the remote entity as usual.

The features shall be considered to be disclosed in any combination with each other. Further, the disclosure of any means for performing a method step shall be understood to also disclose the respective method step and the disclosure of a method step shall be understood to also disclose respective means for performing the step.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

DETAILED DESCRIPTION

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include micro-electronic-mechanical systems (MEMS), integrated circuits (e.g. application specific), microprocessors, microcontrollers, digital signal processors (DSPs), field programmable gate arrays (FPGAs), programmable logic devices (PLDs), gated logic, discrete hardware circuits, printed circuit boards (PCB) (e.g. flexible PCBs), and other suitable hardware configured to perform the various functionality described throughout this disclosure, e.g. sensors, e.g. for sensing and/or registering physical properties of the environment, the device, the user, etc. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

In the following different exemplary protocols are described, which can be used in the different aspects of the present disclosure, and different use cases are described, in which the different aspects of the present disclosure can be used.

Figure 1:
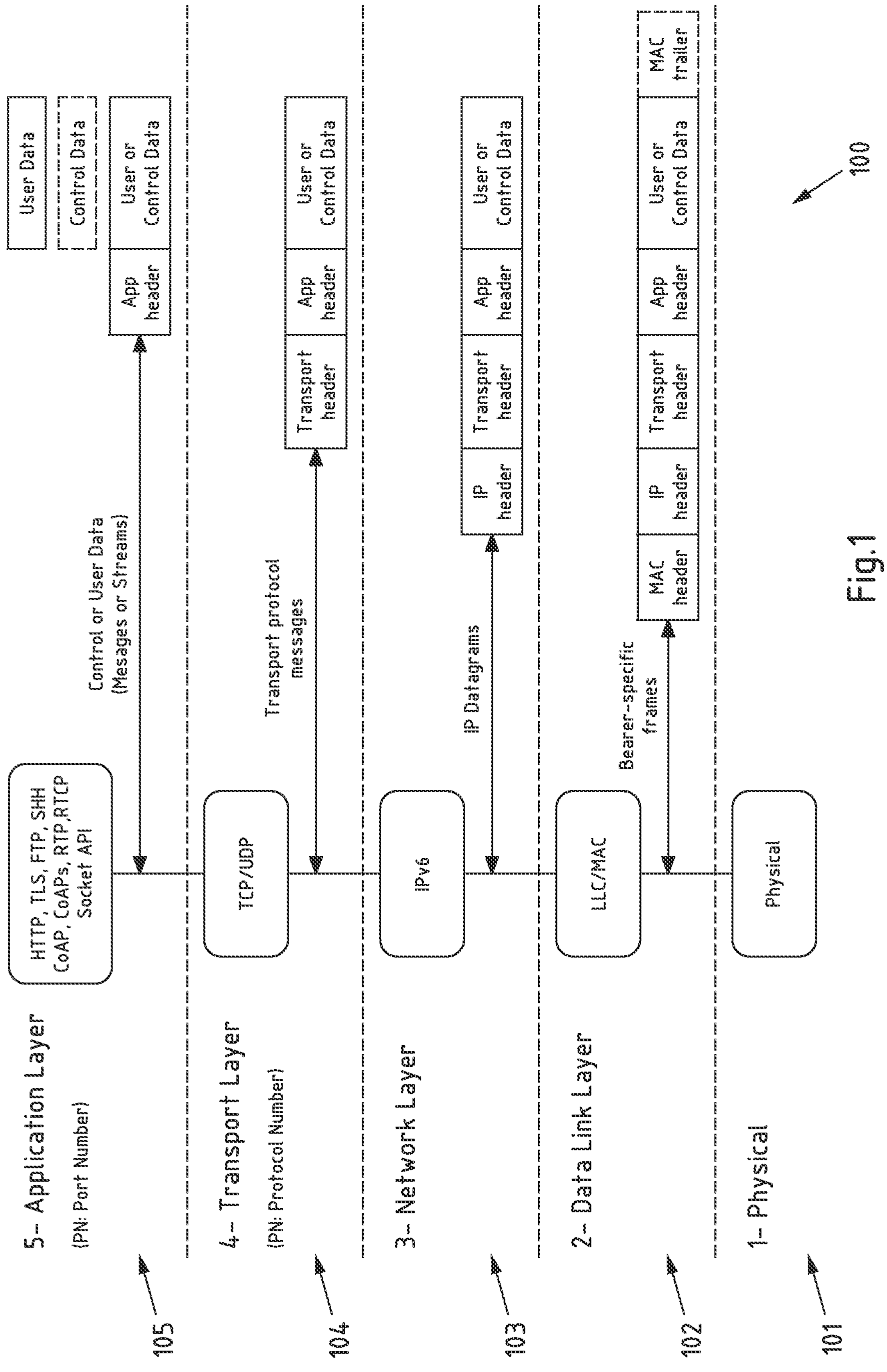
FIG. 1 illustrates an exemplary layered IP protocol stack.

FIG. 1 depicts an exemplary five layered view of a protocol stack 100 comprising an internet or network layer 103 with an internet protocol (thus an "Internet Protocol stack", or "IP stack") with an illustration of how successive headers are added by protocols working at each layer 101-105. Each layer 101-105 handles a particular set of problems involving some aspect of sending data between distributed user applications, i.e. applications that are running on devices (such as a hearing aid system and a remote entity as described in more detail below), which are connected to the same or different networks. As the raw application data (such as user data or control data, as disclosed in the present disclosure) moves from the application layer 105 down through the various layers 102-104, it is wrapped up (or encapsulated) within protocol data units (PDUs) created by each of the protocols it encounters. The names commonly used to refer to these PDUs tend to vary. E.g. at the network layer they are called packets or datagrams. At the link layer, they are more often called frames.

Data from an application is passed down to the appropriate application layer protocol, which encapsulates the data within a protocol data unit (PDU) by adding some header information. The entire PDU is then passed down to the transport layer protocol and undergoes a similar process here. This encapsulation is repeated for the network layer and the link layer. The frame that is built by the link layer is then sent to a (e.g. border) router or network switch via a physical transmission medium as a stream of bits or symbols.

A functional description of each layer 101-105, which may be employed in a hearing aid system (e.g. in a hearing aid, auxiliary device) or remote entity according to the present disclosure, is given in the below table:

| Layer | Functional description |
|---|---|
| Application layer 105 | An application layer protocol is specific to a particular type of application (e.g. file transfer, electronic mail, network management etc.) and is sometimes embodied within the application's client software, although it could also be implemented within the operating system software. The interface between an application layer protocol and a transport layer protocol is defined with reference to port numbers and sockets. Further it defines the format and organization of data including encryption and authentication. |

-continued

| Layer | Functional description |
|---|---|
| Transport layer 104 | This layer handles the end-to-end transfer of data and can handle a number of data streams simultaneously. It provides a variety of services between two host computers, including connection establishment and termination, flow control, error recovery, and segmentation of large data blocks into smaller parts for transmission. The two main transport layer protocols are: 1. Transmission Control Protocol (TCP), which provides a reliable, connection-oriented service. 2. User Datagram Protocol (UDP) provides an unreliable, connectionless service (delivery is not guaranteed, but UDP is useful for applications for which speed is more important than reliability). |
| Network layer 103 | This layer provides addressing and routing functions that ensures messages are delivered to their destination. Internet Protocol (IP) is a connectionless, unreliable protocol that does not provide flow control or error handling, and attempts to deliver IP datagrams on a best-effort basis. Network devices called routers forward incoming datagrams according to the destination IP address specified within the IP packet. |
| Data Link layer 102 | This layer formats data into frames appropriate for transmission onto a physical medium. Defines rules for when the medium can be used and general link management. Defines the means by which to recognize transmission errors. May include authentication and encryption between the data link devices. This layer can be divided into two sublayers: Logical Link Control (LLC) and Media Access Control (MAC). The LLC sublayer is on top of the MAC sublayer and is responsible for Cyclic redundancy Checking (CRC), sequencing information, and adding appropriate source and destination information. The MAC sublayer controls device interaction allocating medium access. |
| Physical layer 101 | Defined the electrical, radio frequency, optical, cable-link, connectors, and procedural details requiring transmitting and receiving bits, represented as some form of energy passing over a physical medium. |

In the following different exemplary protocols of these layers 101-105 are described, which may also be employed in a hearing aid system (e.g. a hearing aid or auxiliary device) or remote entity according to the present disclosure.

There are several standardized application layer protocols (cf. e.g. Service Name and Transport Protocol Port Number Registry, www.iana.org/assignments/service-names-port-numbers/service-names-port-numbers.xhtml, where they are called services). The following table shows a short list of exemplary standardized application layer protocols, which may be employed in the different aspects according to the present disclosure:

| Application layer protocols | Description | App Header size [octets] |
|---|---|---|
| Constrained Application Protocol (CoAP) | CoAP is a protocol that is intended for use in resource-constrained internet devices, such as wireless sensor network nodes. | Between 5 and 17 |
| File Transfer Protocol (FTP) | A network protocol used for the transfer of computer files between a client and server on a computer network. | TBD |
| Hypertext Transfer Protocol (HTTP) | HTTP is the foundation of data communication for the World Wide Web, where hypertext documents include hyperlinks to other resources that the user can easily access, for example by a mouse click or by tapping the screen in a web browser | TBD |
| Message Queuing Telemetry Transport Protocol (MQTT) | Runs any network protocol that provides ordered, lossless, bi-directional connections e.g. TCP. Defines two types of network entities: a message broker and a number of clients. An MQTT broker is a server that receives all messages from the clients and then routes the messages to the appropriate destination client | |
| Real-time Transport Protocol (RTP) | RTP is a network protocol for delivering audio and video over IP networks. | |
| Real Time Streaming Protocol (RTSP) | RTSP is a network control protocol designed for use in entertainment and communications systems to control streaming media servers. | |

Two exemplary transport layer protocols in the IP stack are the Transmission Control Protocol (TCP) and the User Datagram Protocol (UDP). An overview over the differences between TCP and UDP is provided in the below table:

| Transmission Control Protocol (TCP) | User Datagram Protocol (UDP) |
|---|---|
| TCP is a connection-oriented protocol. Connection-orientation means that the communicating devices should establish a connection before transmitting data and should close the connection after transmitting the data | UDP is the Datagram oriented protocol. This is because there is no overhead for opening a connection, maintaining a connection, and terminating a connection. UDP is efficient for broadcast and multicast type of network transmission. |
| TCP is reliable as it guarantees delivery of data to the destination | The delivery of data to the destination cannot be guaranteed in UDP. |
| TCP provides extensive error checking mechanisms. It is because it provides flow control and acknowledgment of data. | UDP has only the basic error checking mechanism using checksums. |
| Sequencing of data is a feature of Transmission Control Protocol (TCP), this means that packets arrive in-order at the receiver. | There is no sequencing of data in UDP. If ordering is required, it has to be managed by the application layer |
| Retransmission of lost packets is possible in TCP. | There is no retransmission of lost packets in UDP |
| TCP has a (20-80) bytes variable length header. | UDP has a 8 bytes fixed length header |
| TCP does not support Broadcasting. | UDP supports Broadcasting |

Figure 2:
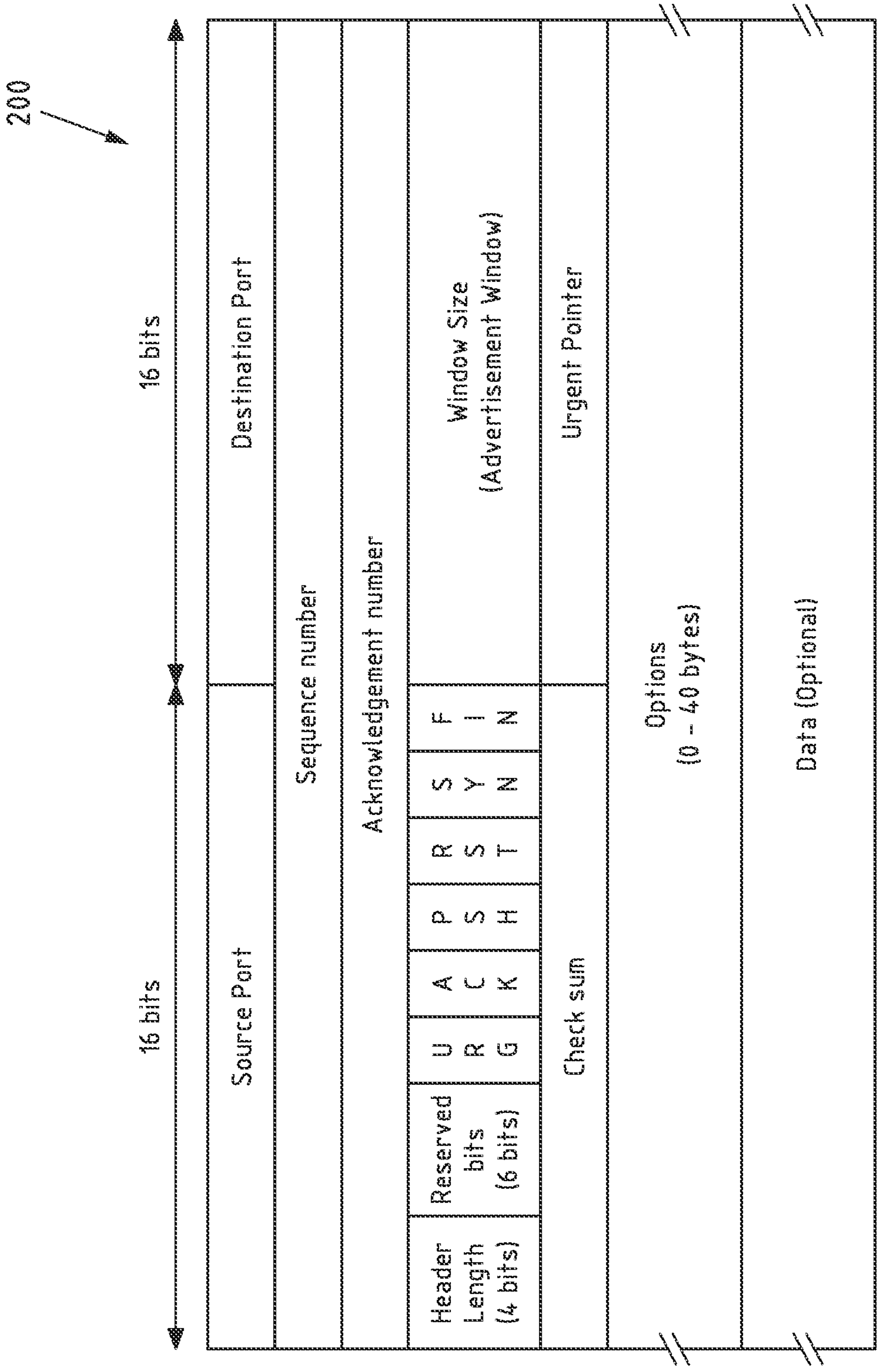
FIG. 2 illustrates a TCP header format.
Figure 3:
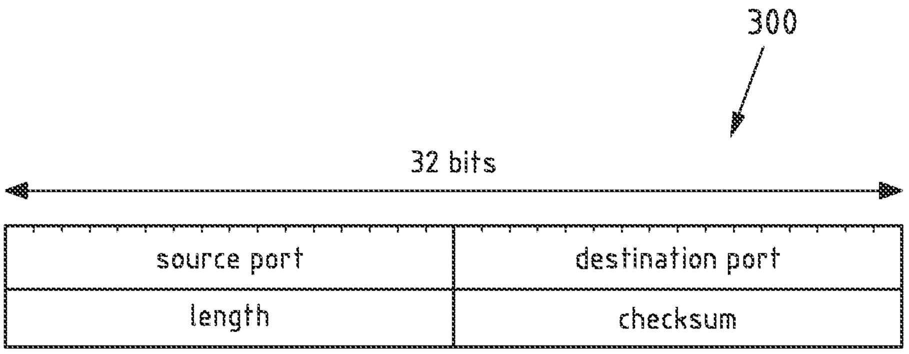
FIG. 3 illustrates a UDP header format.

FIGS. 2 and 3 show the header formats 200, 300 of the two transport layer protocols "Transmission Control Protocol" (TCP) and "User Datagram Protocol" (UDP), which may be employed in a protocol stack according to the present disclosure.

As already mentioned above, the network layer 103 of FIG. 1 comprises an Internet Protocol. An Internet Protocol ("IP") deals with getting the datagrams form the source all the way to the destination. Getting to the destination may involve making many hops at routers (intermediate nodes). IP provides a best effort network layer service connecting endpoints (computers, phones, etc.) to form a computer network. The IP network service transmits datagrams between (intermediate nodes) using IP routers.

There are generally two relevant deployed Internet Protocols or specifications thereof: Internet Protocol version 4 (IPv4) and Internet Protocol version 6 (IPv6). IPv4 is the fourth version of the Internet Protocol (IP). IPv4 was the first version deployed for production in the in 1983. It still routes most Internet traffic today, despite the ongoing deployment of the successor protocol, IPv6. IPv4 and IPv6 are described in the Internet Protocol, Version 4 (IPv4) Specification (https://tools.ietf.org/html/rfc791) and the Internet Protocol, Version 6 (IPv6) Specification (https://tools.ietf.org/html/rfc2460), respectively.

One of the important differences between IPv4 and IPv6 is the address length, where IPv4 uses a 32-bit address scheme allowing for a total of 2^32 addresses—just over 4 billion address—whereas IPv6 uses a 128-bit address scheme allowing for about 2^128 addresses. With the growth of the Internet it is expected that the number of unused IPv4 addresses will eventually run out because every device (phones, PCs, game consoles, ear buds, hearing aids, etc.) that connects to the Internet requires an address.

The size of the IPv4 header is between 20 and 60 octets (depends on the length of the option field, which may be up to 16 octets) whereas the iPV6 header is 40 octets, though an extension header may be added as part of the payload field. The extension header is minimum 4 octets or more (cf e.g. IPv6 header, https://en.wikipedia.org/wiki/IPv6_packet).

In order to now enable a direct IP link between a hearing aid and a remote entity, a protocol stack with an internet protocol (IP stack) is supported in the hearing aid.

Figure 4:
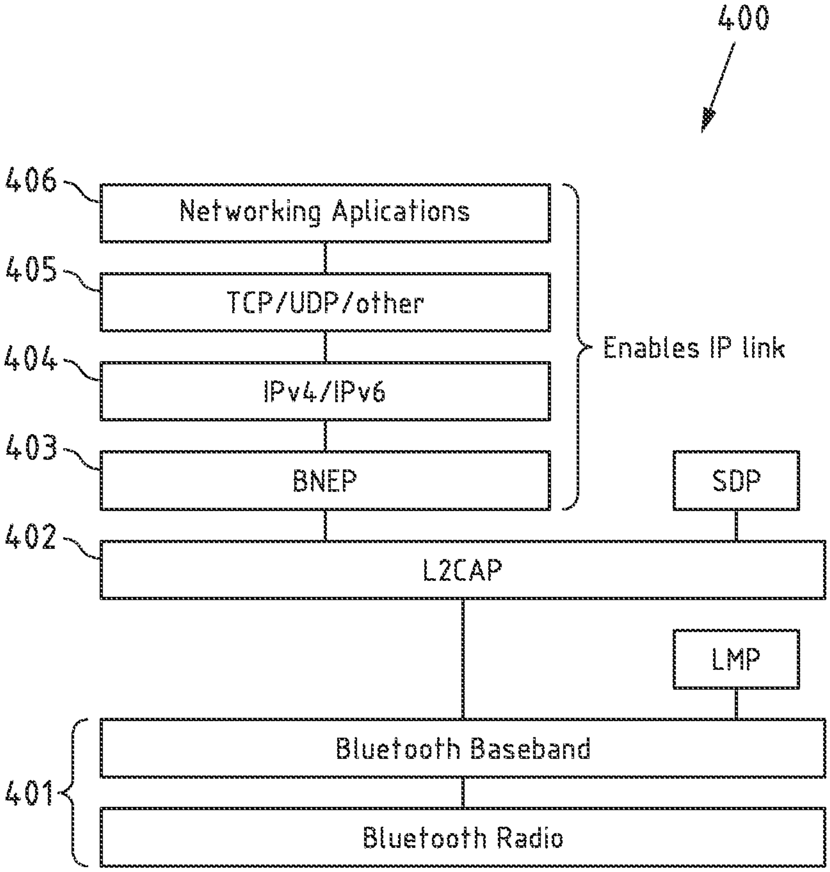
FIG. 4 illustrates an exemplary IP stack overview for Classic Bluetooth enabling an IP link.
Figure 5:
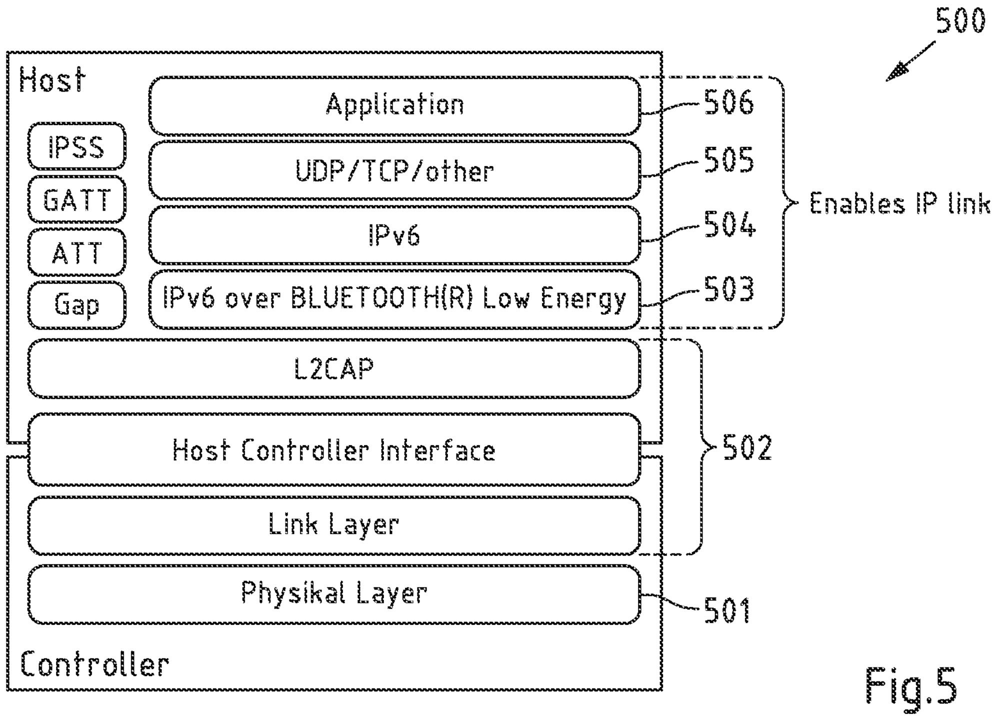
FIG. 5 illustrates an exemplary IP stack overview for Low Energy enabling an IP link.

A preferred approach according to the present disclosure is the employment of an IP link in the frame of the Bluetooth standard, which is explained in more detail with respect to FIGS. 4 and 5. One option is the use of the Bluetooth Network Encapsulation Protocol (BNEP) for Classic Bluetooth, which is specified in in the Bluetooth Network Encapsulation Protocol (BNEP) Specification (see www.bluetooth.org/docman/handlers/DownloadDoc.ashx?doc_id=6552). A corresponding protocol stack 400 is illustrated in FIG. 4. The protocol stack 400 inter alia comprises a physical layer 401 with Bluetooth Radio and a Bluetooth Baseband, a link layer 402 with the L2CAP protocol, a network sub-layer 403 with the BNEP protocol, a network/internet layer 404 (with an internet protocol such as IPv4 or IPv6), a transport layer 405 and an application layer 406.

Another option is the Internet Protocol Support Profile (IPSP) for Bluetooth Low Energy, which is for instance specified under www.bluetooth.org/docman/handlers/DownloadDoc.ashx?doc_id=296307. A corresponding protocol stack 500 is illustrated in FIG. 5. The protocol stack 500 inter alia comprises a physical layer 501, a link layer 502 comprising inter alia the L2CAP protocol, a network sub-layer 503 with the 6LoBTLE protocol (which is now according to RFC 7668 called IPv6 over BLUETOOTH® Low Energy), a network/internet layer 504 with an internet protocol such as IPv6, a transport layer 505 and an application layer 506. BNEP supports transport of both IPv4 and IPv6 datagrams whereas IPSP only supports IPv6 datagrams.

To save power, low power radio protocols such as Bluetooth uses small (bearer-specific) frame sizes. The frame size dependents on the amount of payload and the amount of control (signaling) data that are required. Hence it is important to minimize the amount of overhead in the data link layer frame in a lower power protocol.

With reference to FIG. 4, BNEP removes and replaces the IP header with a BNEP Header when a frame with a message is transmitted. The opposite is the case when a frame with a message is received. Finally, both the BNEP Header and the IP payload is encapsulated by the Bluetooth Logical Link Control and Adaptation Protocol (L2CAP) followed by the baseband or Link Layer protocol and is sent over the physical media. The BNEP header is typically between 4 and 16 octets, which is a significant reduction compared to the sizes of the IPv4 and IPv6 headers. Generally, layers 403-406 may be considered as enabling a direct IP link from the hearing aid to the remote entity.

With reference to FIG. 5, for IP transports via Bluetooth Low Energy (LE) the IPv6 over Bluetooth Low Energy (6LoBTLE) specification (cf. IPv6 over BLUETOOTH® Low Energy) is used for e.g.:

link establishment to an auxiliary device, such as an IPSP router;

neighbor discovery, i.e. other IPSP nodes connected to the same router; and/or compression of the IPv6 header to between 2 to 20 octets.

Generally, layers 503-506 may be considered as enabling a direct IP link from the hearing aid to the remote entity.

Depending on the point of view, the allocation of different protocols to different layers may not always be strict and unambiguous. However, typically both BNEP and 6LoBTLE are typically considered sub-layers in the networking layer or an adaptation layer, i.e. below the IP protocol.

The BNEP or IPSP stack 400, 500 is often part of the auxiliary device or typical gateway used (i.e. smartphone, tablet, personal computer or a combo WiFi/Bluetooth router with BNEP or IPSP). If BNEP and/or IPSP is now supported in the hearing aid, then vendor specific software is the not needed on the auxiliary device to access internet connected servers from the hearing aid. A corresponding system with a remote entity and a hearing aid system establishing an end to end IP link is shown in FIG. 6.

Figure 6:
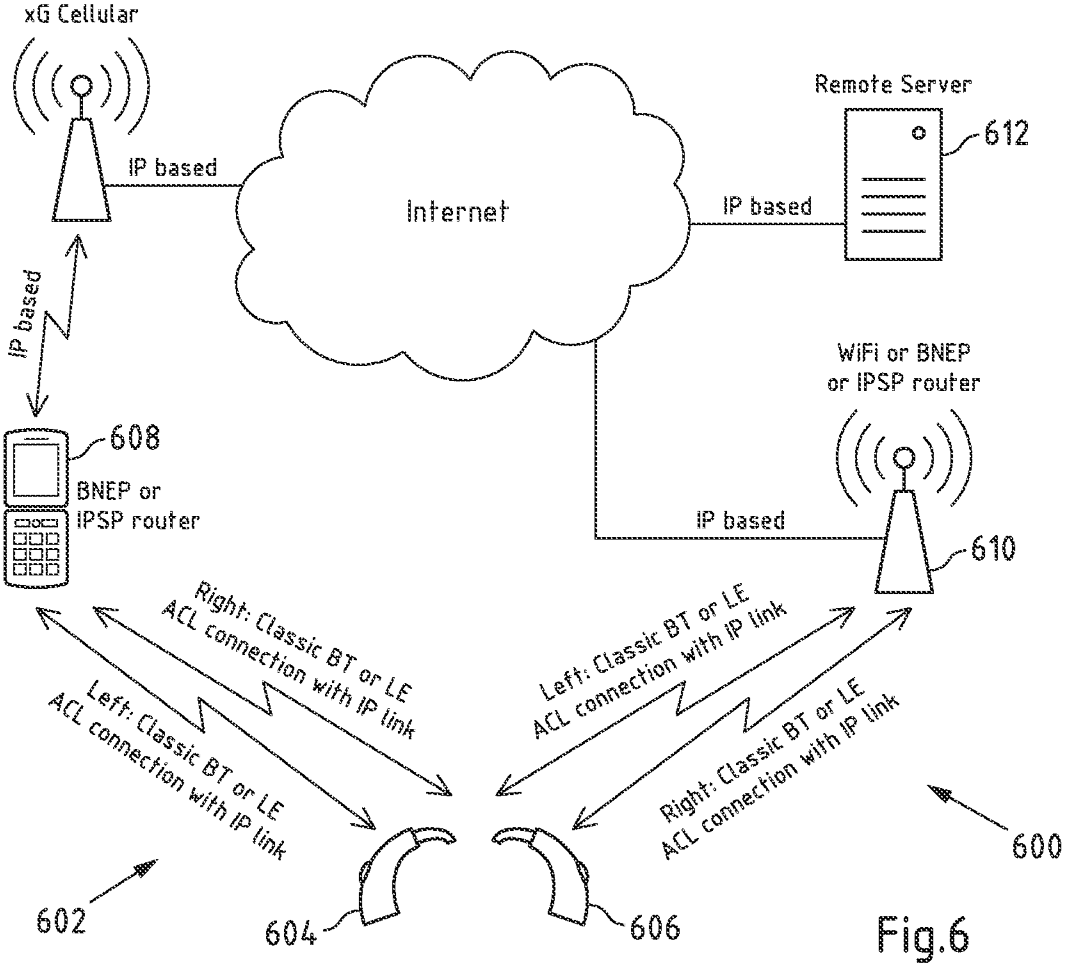
FIG. 6 illustrates an exemplary system allowing an end to end IP link between a remote entity and a hearing aid system.

The system 600 of FIG. 6 comprises a hearing aid system 602 with a first hearing aid 604 and a second hearing aid 606. The hearing aid system further comprises an auxiliary device in the form of a mobile device 608 or a router 610. The system 600 further comprises a remote server 612. While the hearing aids 604 and/or 606 are physically connected to the one or more auxiliary devices 608 and/or 610 via Bluetooth or Bluetooth LE, the first and/or second hearing aid 604, 606 establishes a direct IP link to the remote server 612 over the internet. This is possible by e.g. employing a protocol stack, such as IP stack 400 or 500, as described above. While the connection between the auxiliary devices 608, 610 and the server 612 is a standard IP based connection, the IP data in the connection between the hearing aid 604, 606 and the auxiliary device is encapsulated in the Bluetooth protocol.

Figure 7:
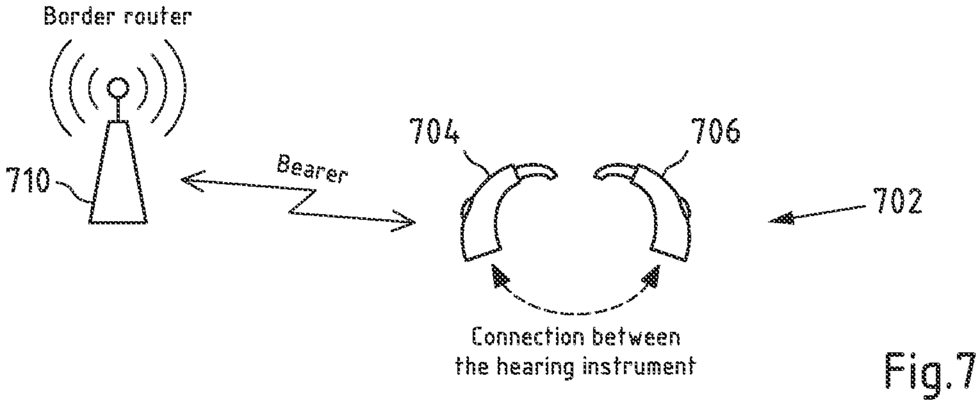
FIG. 7 illustrates an exemplary IP link to a hearing aid system and forwarding between the hearing aids.

It may be that only one of the two hearings aids 604, 606 of FIG. 6 has a Bluetooth connection (IP link) to a border router, for instance. In that case, the hearing aid 604, 606 with the Bluetooth connection may relay the IP payload to the other hearing aid by means of separate connection between the two hearing aids, as illustrated with hearing aids 704, 706 and border router 710 of hearing aid system 702 in FIG. 7. For example the connection can be a Bluetooth connection as well, but also a vendor specific connection.

Further options for realizing an IP stack in a hearing aid will be described with reference to FIG. 30 below.

In the following different use cases are described, which are enabled by realizing an IP Link by the hearing aid.

Figure 8:
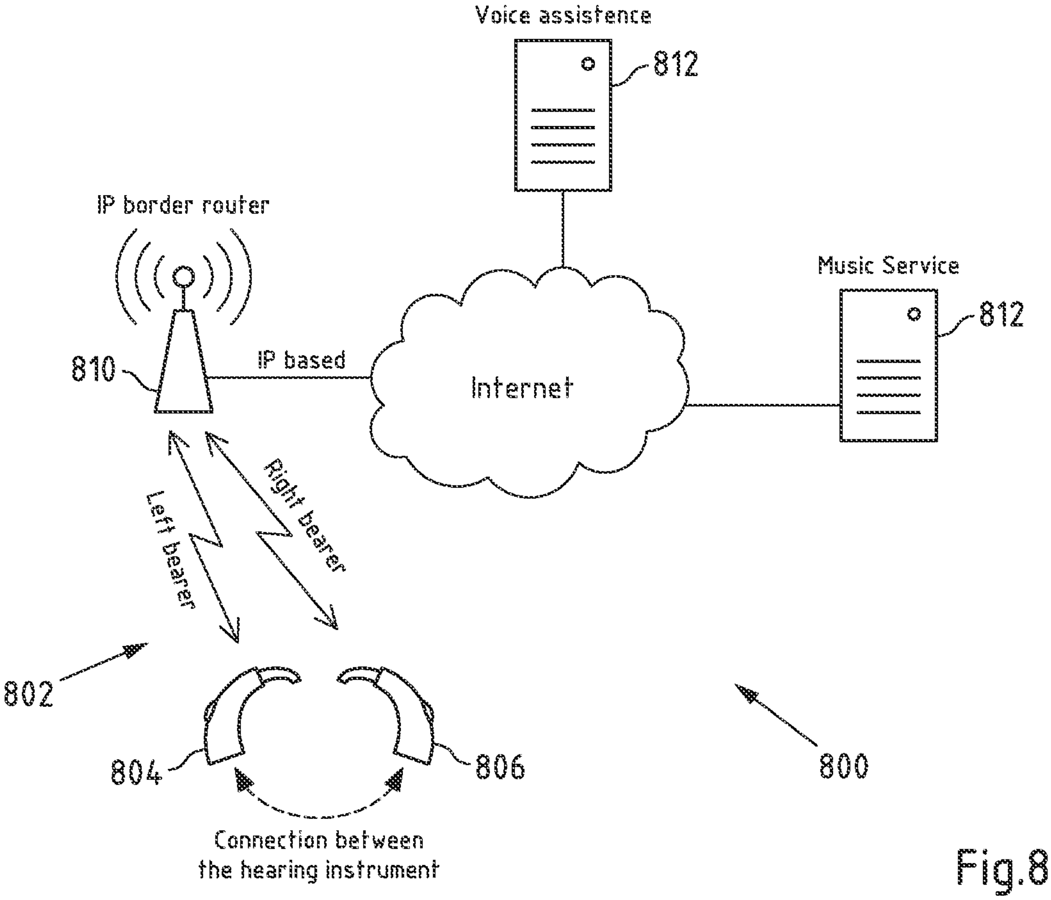
FIG. 8 illustrates an exemplary system with IP streaming and voice assistant capabilities.

One example of a use case is the streaming of audio. A corresponding system 800 is exemplarily shown in FIG. 8. The following streaming use cases are possible. As one example, a remote server 812 can stream music directly to the hearing aid. Based on either timestamp, codec frame number or both provided by the remote entity (such as a server), the hearing aids 804, 806 of hearing aid system 802 may synchronize the rendered audio via a connection between the hearing aids. The connection between the hearing aids 804, 806 can be magnetic or RF based. As another example, a two-way session may be employed, in which the end user speaks with a remotely located person, via a remote server bridge to a voice assistant (such Alexa, Siri or Google) and/or directly with a (human) voice assistant. As yet another example, the hearing aid may stream audio one-way to a server 812, e.g. for control commands. Additionally or alternatively, the remote server 812 can notify the user with a one-way audio stream, e.g. when there are (feature) updates.

Figure 9:
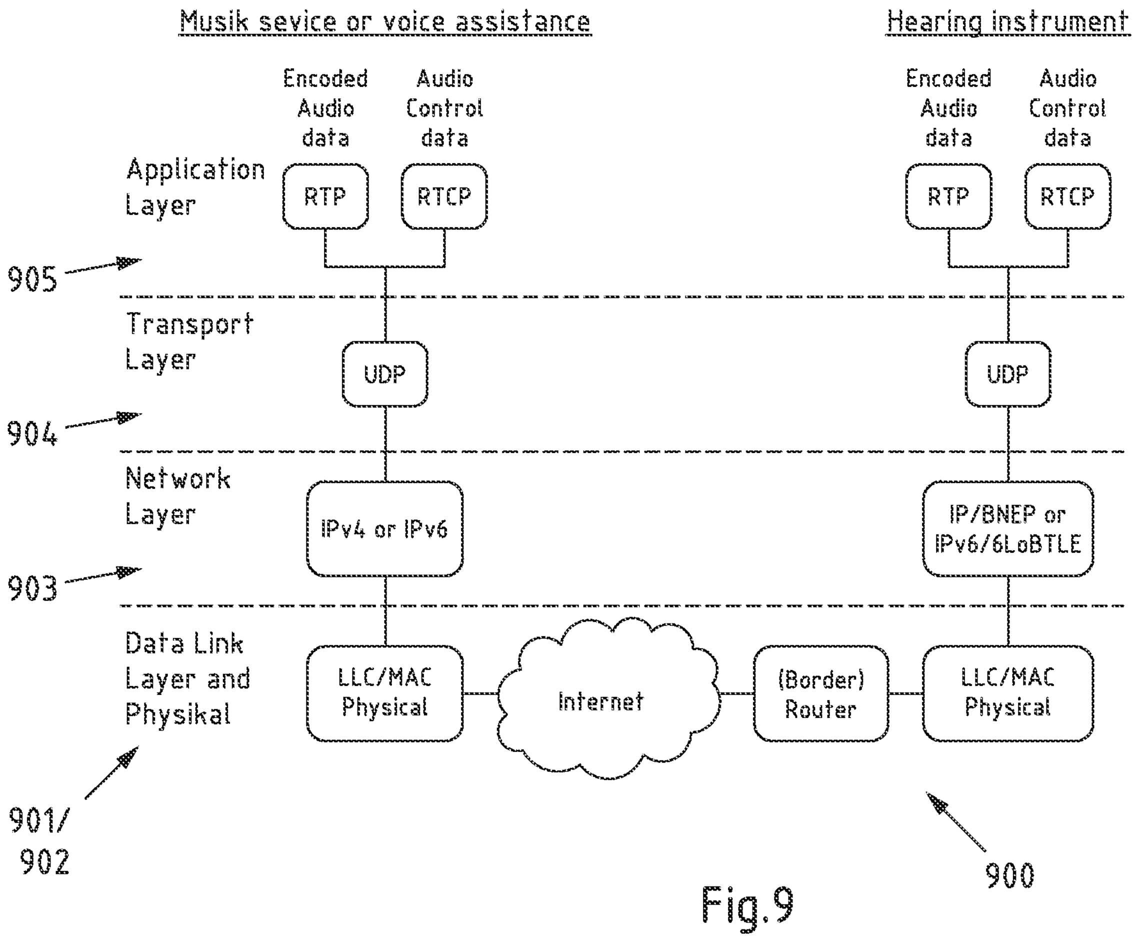
FIG. 9 illustrates an exemplary IP stack configuration for music streaming and voice assistant.

A corresponding example of an IP stack 900 with layers 901-905 for this use case is shown in FIG. 9. In the application layer 905, the RTP (Real-time Transport Protocol) is used for transport of encoded audio data, and the RTCP (Real-time Transport Protocol Control Protocol) is used for transport of audio control messages. These Protocols are described in the Real-Time Protocol (RTP) and RTP Control Protocol (RTCP) Specification. UDP is used as the transport protocol in transport layer 904.

Figure 10:
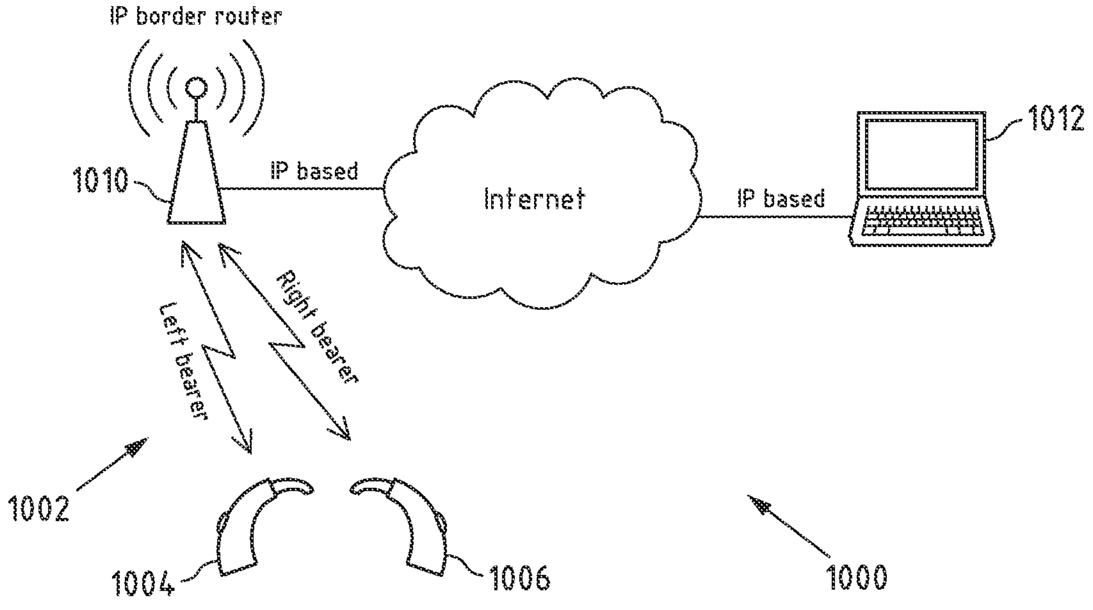
FIG. 10 illustrates an exemplary system enabling remote fitting with a border router device.

Another example of a use case is the Fitting procedure. FIG. 10 illustrates an exemplary system 1000 with hearing aid system 1002, hearing aids 1004, 1006, border router 1010 and remote server 1012 for this use case. The benefits of a fitting procedure while employing an internet protocol at the hearing aid are as follows: No fitting gateway (like the Noahlink Wireless) is needed. In order to increase the fitting speed, two routers—one for each hearing instrument—can be used. During the fitting procedure, the dispenser can simultaneously speak via IP with the end user, as described above with respect to the communication to a assistant.

While today's hearing aids can already be remotely fitted, this requires either via a wireless connection to a dedicated fitting device or a connection to a mobile phone, tablet or computer, which must contain a dedicated fitting application or piece of fitting software. However, if the hearing aid 1004, 1006 supports an internet protocol, such as IPv4 or IPv6, and a bearer e.g. Bluetooth, then any auxiliary device (phone/tablet/pc) which can operate as an IP border router 1010 and with a bearer compatible to the bearer employed by the hearing aid can be used as the fitting device without the need for any dedicated device or dedicated software. During the remote fitting session, the dispenser and end user can also speak to each other via the IP link (cf. above).

Figure 11:
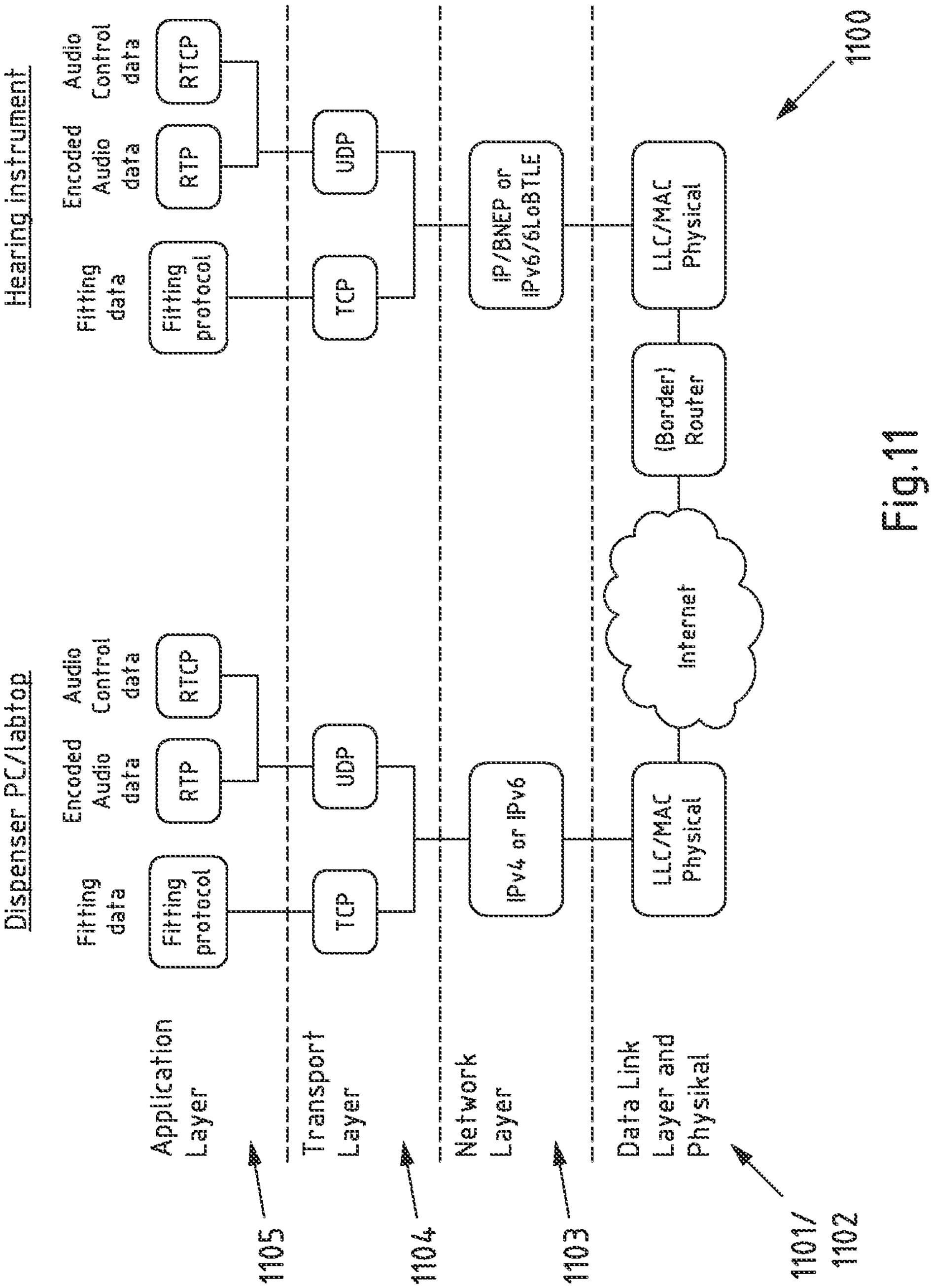
FIG. 11 illustrates an exemplary IP stack configuration for a remote fitting procedure.

FIG. 11 illustrates an exemplary IP stack 1100 with layers 1101-1105 for this use case. At the application layer 1105, a fitting application protocol may be used for transport of the of fitting data, RTP may be used for transport of encoded audio data, and RTCP may be used for transport of audio control messages. At the transport layer 1004, the fitting application protocol may use TCP and the audio application protocols may use UDP. The fitting application protocol can be vendor specific or a standardized protocol e.g. Message Queuing Telemetry Transport (MQTT), specified under http://mqtt.org/.

Figure 12:
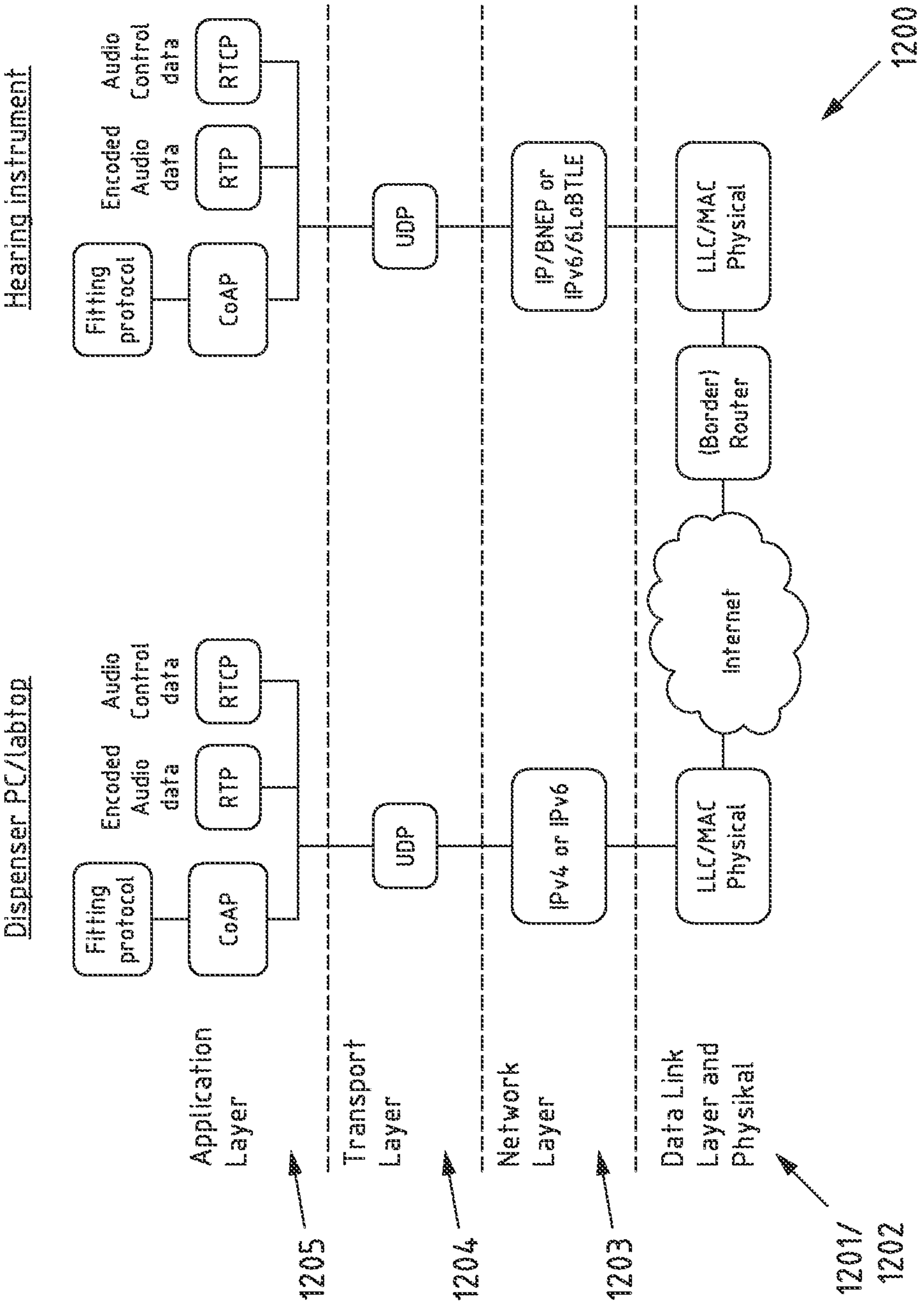
FIG. 12 illustrates an alternative exemplary IP stack configuration for remote fitting.

FIG. 12 depicts an alternative IP stack configuration 1200 with layers 1201-1205 for remote fitting where the fitting protocol uses the Constrained Application Protocol (CoAP), as e.g. specified under https://tools.ietf.org/html/rfc7252, which allows that a message can be acknowledged, which enables reliable data communication in the fitting use case. This is particularly advantageous, as all fitting should be transported reliable, as the hearing aid may behave incorrectly or may even damage the end user's ear, if some fitting data is missing.

Yet another example of a use case is a Device Firmware Update. Similar to the remote fitting use case, a hearing aid can be Device Firmware Updated (DFU) via a wireless connection to a dedicated fitting device or a smart phone, tablet or person computer containing a dedicated fitting application or piece of fitting software. However, if the hearing aid supports an internet protocol, such as IPv4 or IPv6 and a bearer e.g. Bluetooth, then any auxiliary device (such as smart phone, tablet, computer) which can operate as an IP border router and with a bearer compatible with the bearer employed by the hearing aid can be used as the fitting device without the need for any dedicated device or dedicated application or software.

Figure 13:
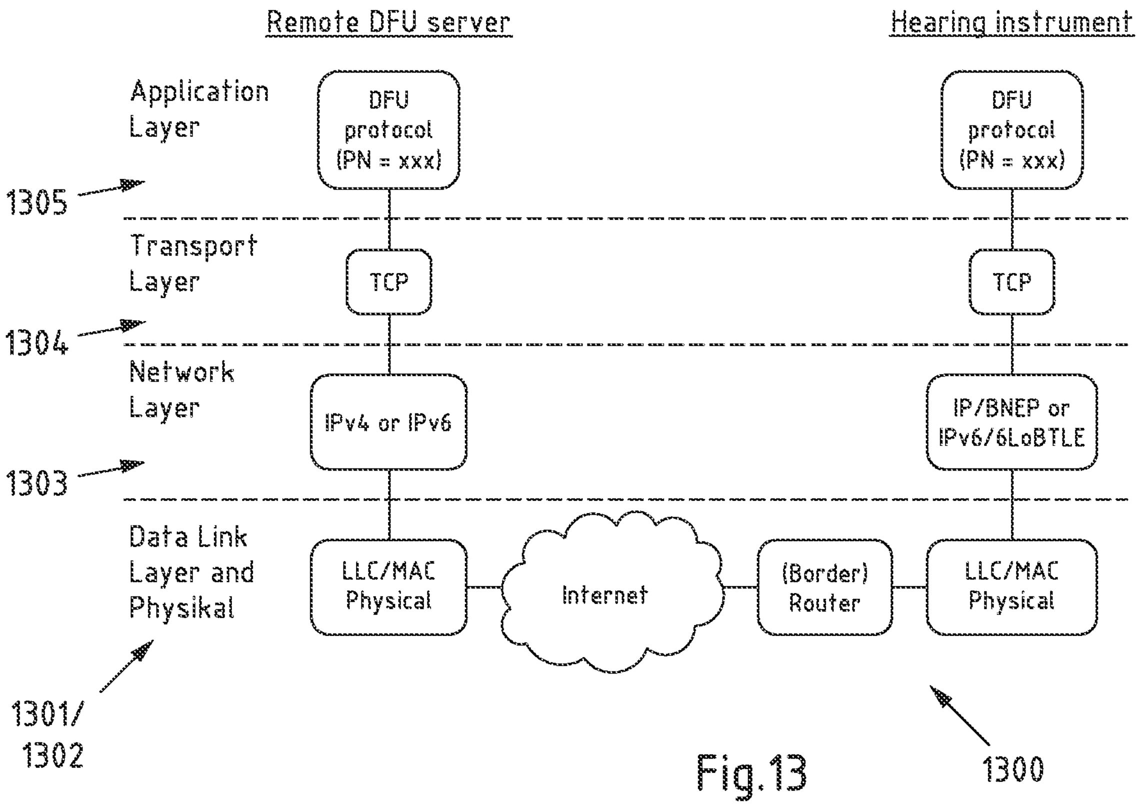
FIG. 13 illustrates an exemplary IP stack configuration for a Device Firmware Update.

FIG. 13 illustrates an exemplary IP stack configuration 1300 with layers 1301-1305 for this use case. At the application layer 1305, a DFU application protocol is used for the transport of the of the DFU data. Alternatively, a standardized file transfer protocol (such as a protocol mentioned under https://en.wikipedia.org/wiki/Comparision_of_file_transfer_protocols) can be used. At the transport layer 1304 TCP may be used.

Figure 14:
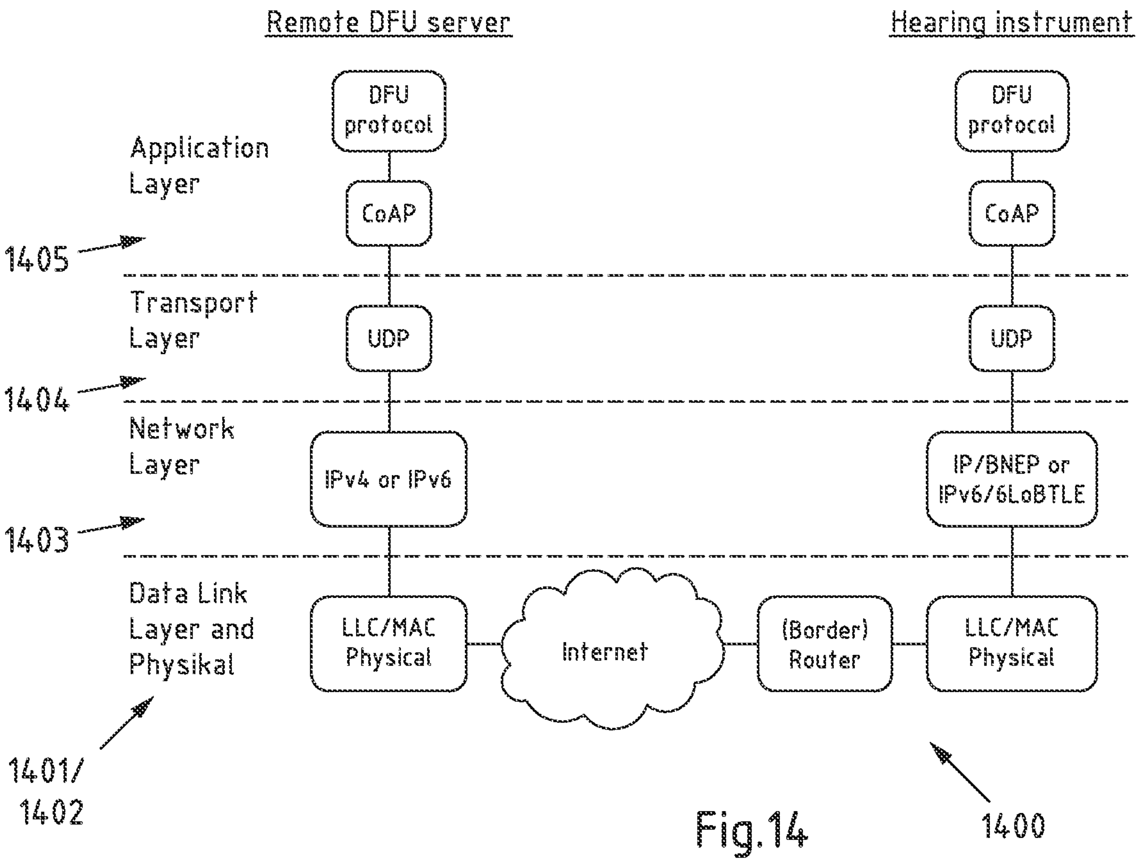
FIG. 14 illustrates an alternative exemplary IP stack configuration for a Device Firmware Update.

FIG. 14 depicts an alternative IP stack configuration 1400 with layer 1401-1405 for the use case of DFU where the DFU protocol uses the Constrained Application Protocol (CoAP). As explained above, this protocol allows that a message can be acknowledged, which enables reliable data communication in the case of a DFU. It is advisable that a DFU data is transported reliable, as the hearing aid may behave incorrectly or may even damage the end user's ear, if some DFU data is missing.

Yet another use case is data harvesting. Various sensors may be implemented in a hearing aid. Examples of such sensors are a microphone, a heart rate sensor, or an electroencephalography (EEG) sensor. The hearing aid may read respective sensor outputs at a regular rate and may in one example store the data in its non-volatile memory. The recorded sensor data can be uploaded to a remote data harvesting server once the hearing aid is connected to the internet, as described above. When the hearing aid is connected, it may also transfer the sensor data directly to the data harvesting server without storing the data on its non-volatile memory. In addition, programs usage statistics and hearing aid status information can be upload directly or stored data can be uploaded when connected to the internet.

Figure 15:
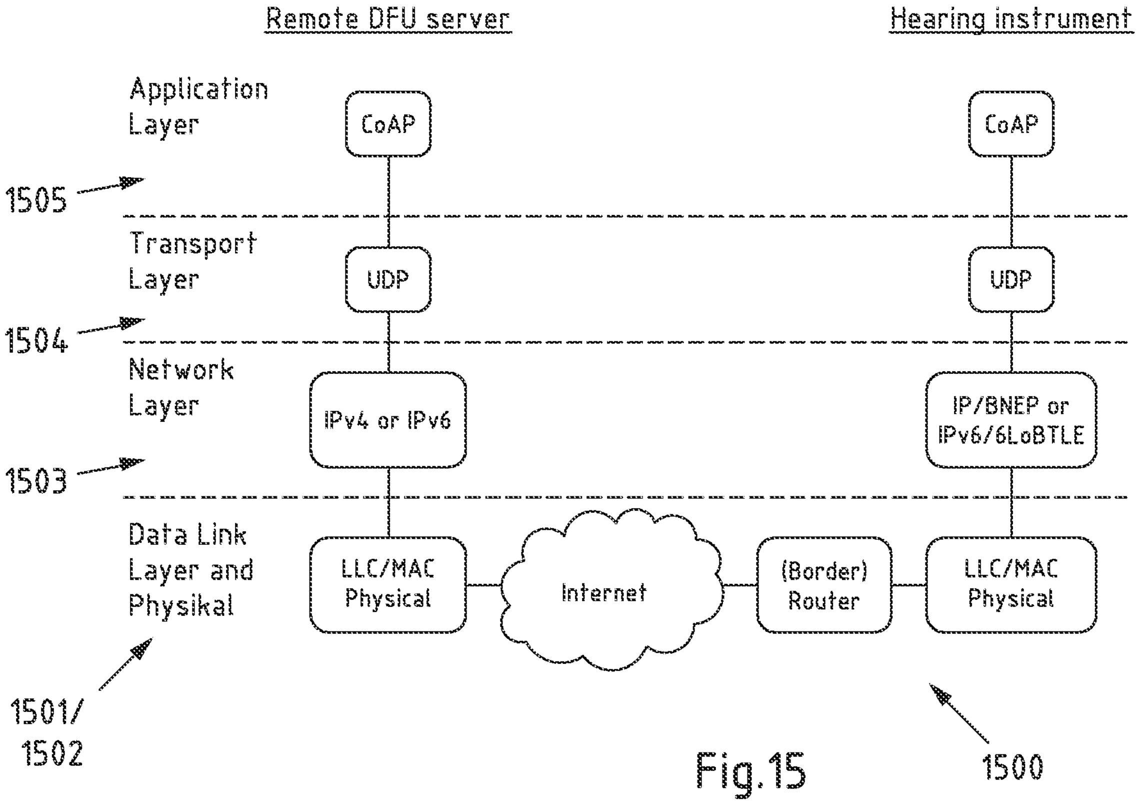
FIG. 15 illustrates an exemplary IP stack configuration for data harvesting.

FIG. 15 illustrates an exemplary IP stack configuration 1500 with layer 1501-1504 for the use case of data harvesting. At the application layer 1505, the Constrained Application Protocol (CoAP) already mentioned above is used as the data harvesting application protocol for transport of the harvested data. Alternatively, a vendor specific protocol may be used, as well. At the transport layer 1504 UDP may be used.

Yet another use case is the optimization or tuning of the neural networks in the hearing instrument. The hearing aid may implement neural networks (NNs), which may need to be optimized or tuned for the specific user. One situation where this is needed could be the voice recognition for spoken commands, where the NNs of the hearing aid need to be optimized to better recognize the hearing aid's users voice, for instance. For instance, the user could be requested (e.g. by the NN tuning server) to speak out certain commends, wherein these commands are then recorded by the hearing aid microphone(s) and are then sent to the NN tuning server together with the NN coefficients. Once the NN (i.e. its coefficients) have been optimized, the coefficients are downloaded to the NNs in the hearing aid.

Another situation where the hearing aid's NNs may need to be optimized or tuned could be in a specific listening situation, where the NNs make a sub-optimum or wrong decision. The situation may be recorded by the hearing aid's microphones and sent to the NN tuning server together with the NN coefficients. During the optimization of the NN coefficients, the user may be asked questions via the audio IP link described above. Once the NN coefficients have been optimized, the coefficients are downloaded to the NNs in the hearing aid.

Figure 16:
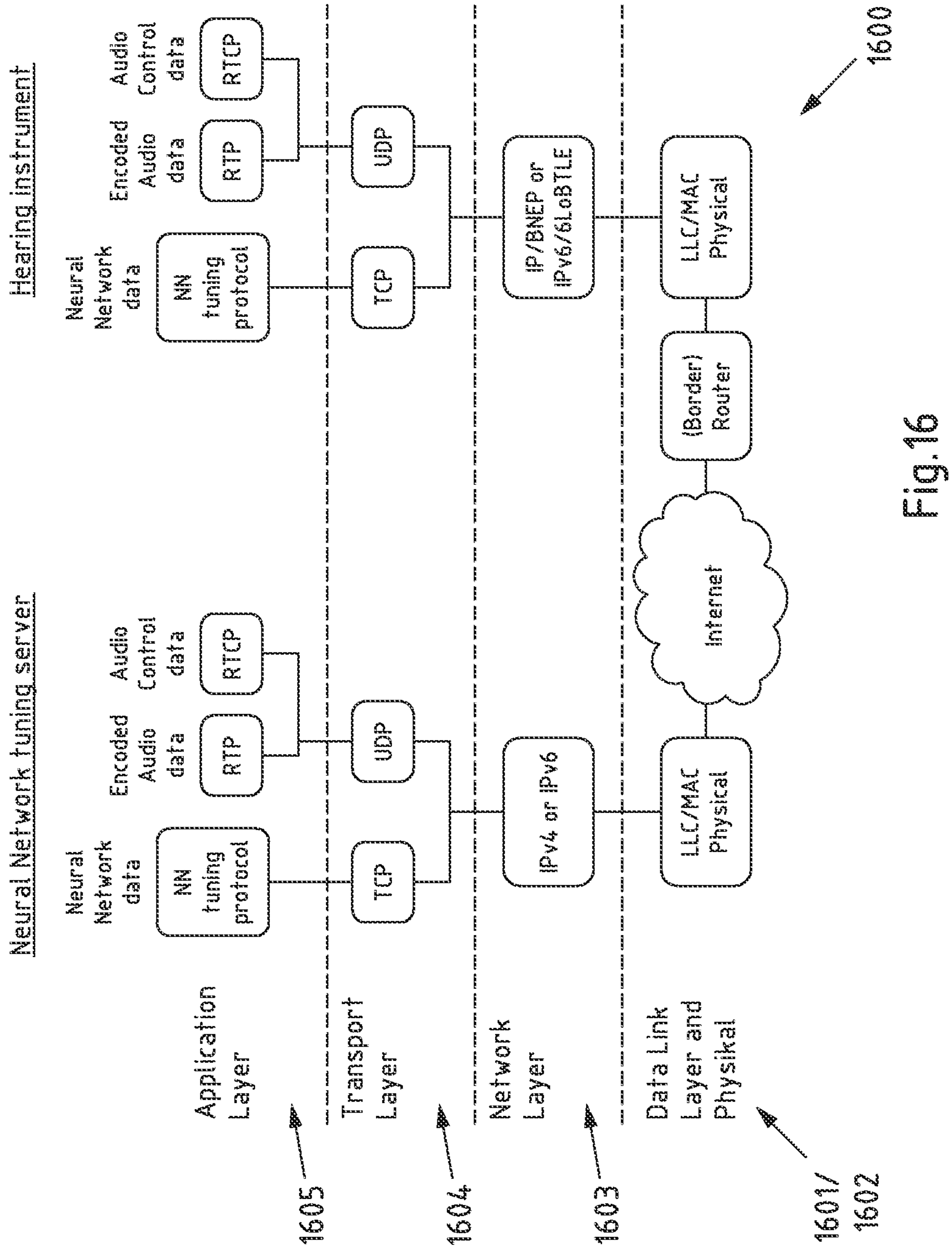
FIG. 16 illustrates an exemplary IP stack configuration for neural network tuning.

FIG. 16 illustrated an exemplary IP stack configuration 1600 with layers 1601-1605 for the use case of neural network tuning. At the application layer 1605, a NN tuning application protocol may be used for the transport of the NN coefficients, whereas RTP may be used for transport of encoded audio data, and RTCP may be used for transport of audio control messages. At the transport layer 1604, the NN tuning application protocol uses TCP and the audio application protocols use UDP. The NN tuning application protocol can be vendor specific or a standardized protocol e.g. Message Queuing Telemetry Transport (MQTT), already mentioned above.

Figure 17:
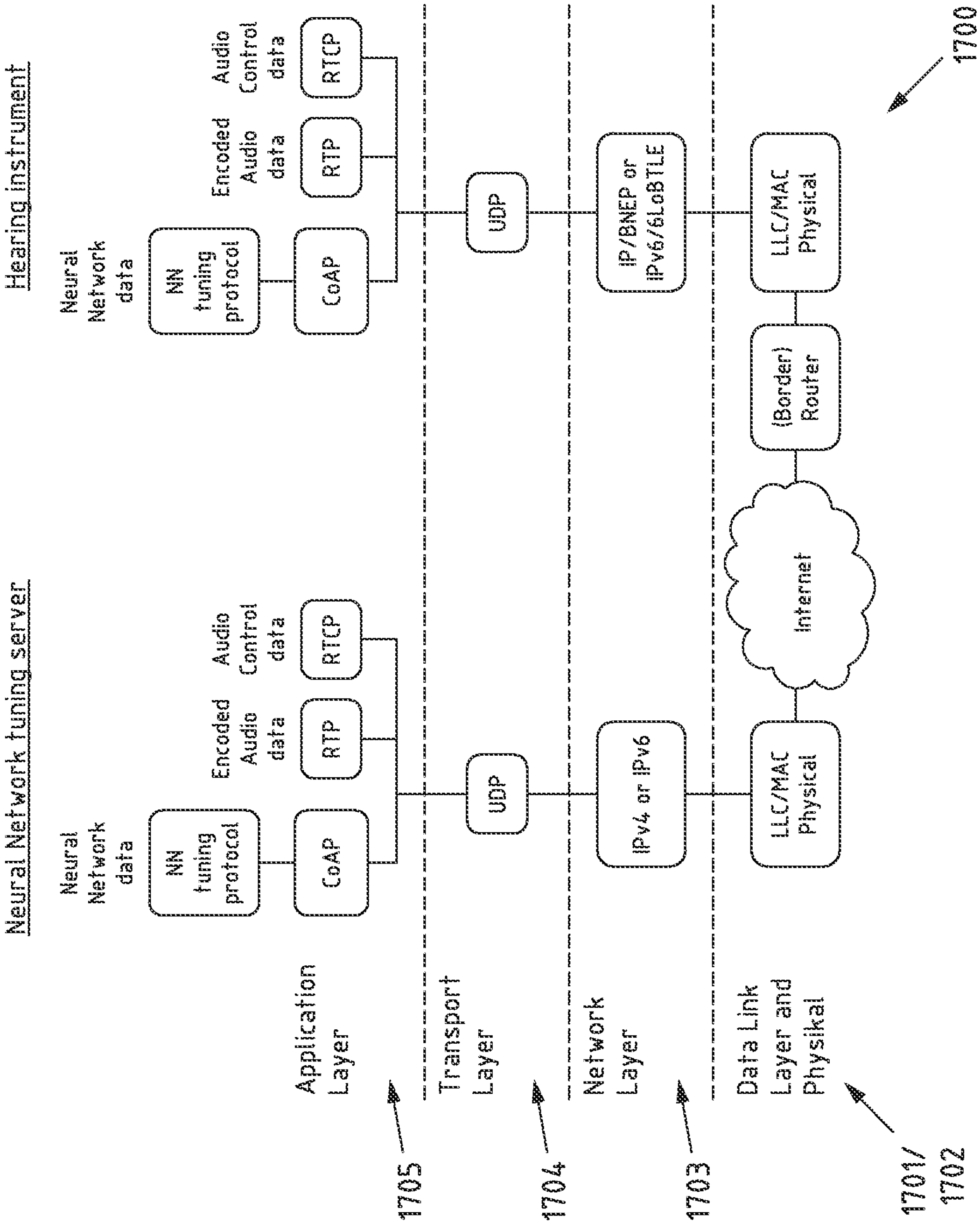
FIG. 17 illustrates an alternative exemplary IP stack configuration for neural network tuning.

FIG. 17 depicts an alternative IP stack configuration 1700 with layers 1701-1705 for neural network tuning where the NN tuning protocol uses the Constrained Application Protocol (CoAP), which allows that a message can be acknowledged, which enables reliable data communication in the exemplary use case of neural network tuning. Neural network data, such as coefficients, should be transported reliable, as the hearing aid may behave incorrectly or even damage the end users ear, if some NN data is corrupted.

Yet another use case is an interaction with a home management system. For instance, the hearing instrument can interact either directly or indirectly via a remote server with the home management system.

The example aspects of the present disclosure may further employ a Constrained Transport Protocol with Security (CTPS), which will be explained more detail in the following.

In the communication via an internet protocol an application on one device communicates with an application on another device in case of uni-cast or more devices in case of multi-cast. Often when two devices (such as the hearing aid and the remote entity) communicate via an internet protocol, multiple applications may be communicating with each other on the two devices. Each message between two respective applications is sent as an individual internet protocol packet, i.e. messages from multiple applications directed at applications of the same destination cannot be bundled together on one IP packet, which would however be desirable to minimize the IP-stack header overhead. The overhead is even larger, if security is enabled in one of the layers from the Network Layer and above.

Figure 18:
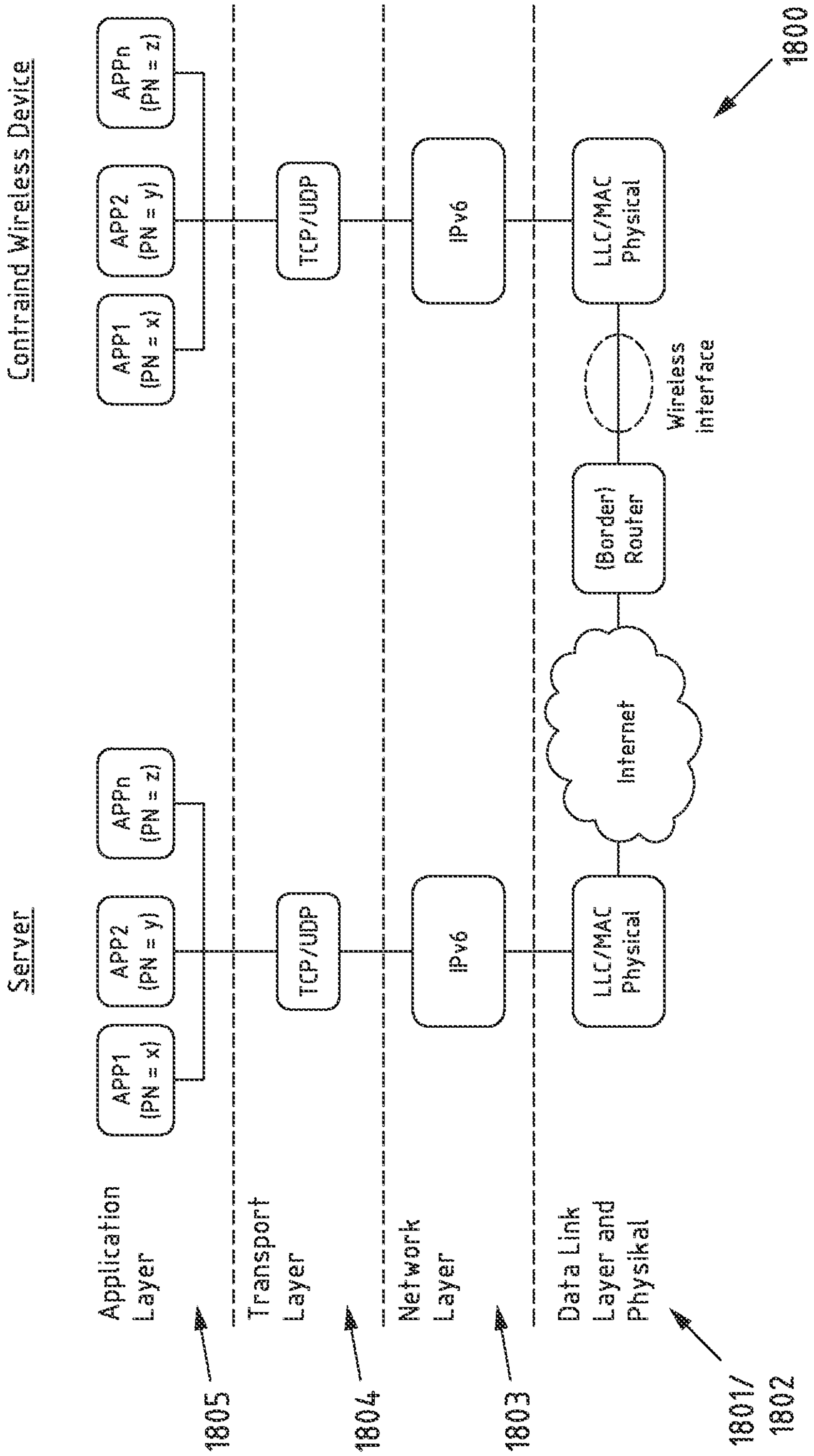
FIG. 18 illustrates a generic IP communication model with a wireless interface.

FIG. 18 shows an exemplary IP communication model 1800 with layers 1801-1805 with a wireless interface where multiple applications are communicating with one another. When one of the devices is a resource constrained device with a wireless interface (such as a hearing aid) then transmitting or receiving packets at the wireless interface containing IP payloads form the individual Application is in-efficient power wise as the radio on-time is higher compared to when the application data from multiple applications were bundled into larger packets. However, that requires that the applications can accept the higher latency as the transmission rate may be reduced while collecting the asynchronous data from multiple applications depending on the transmission frequency and pattern of the multiple applications.

The following sections will describe a transport layer protocol, which deals with the above outlined issues and which may be implemented in a protocol stack according to the present disclosure as described above.

Figure 19:
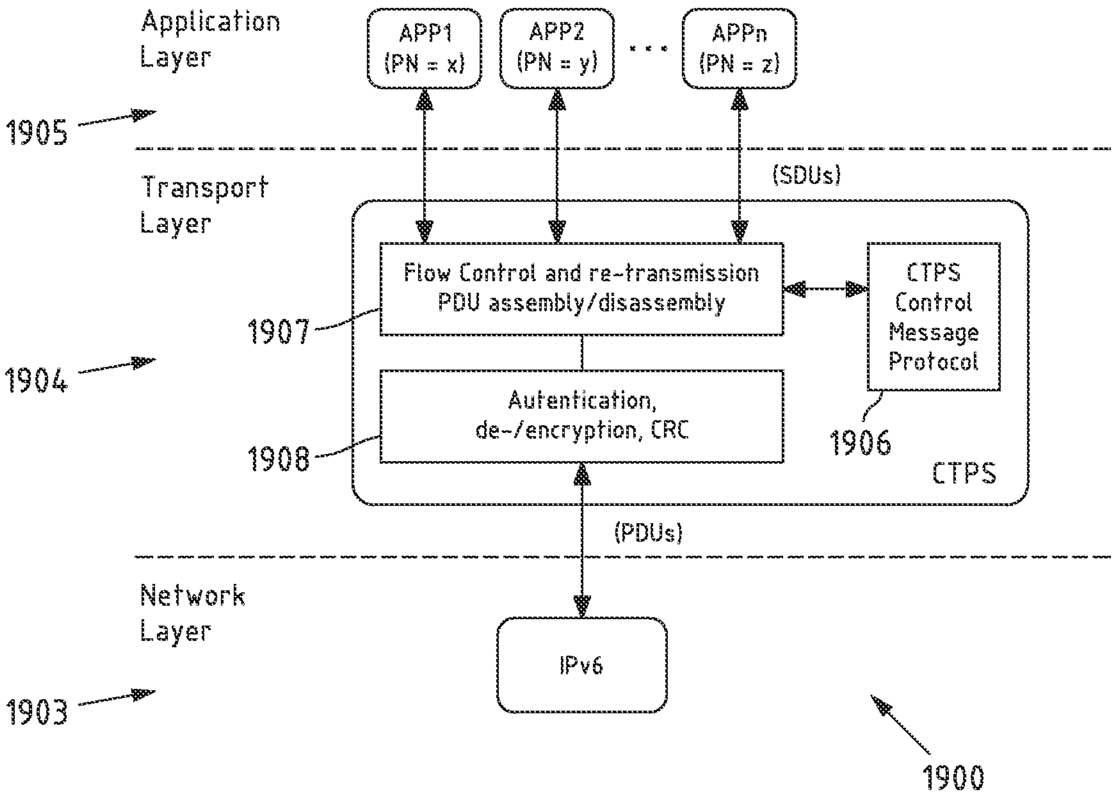
FIG. 19 illustrates an exemplary IP stack with CTPS.

The Application Layer Protocols are often called services (cf. e.g. Service Name and Transport Protocol Port Number Registry, www.iana.org/assignments/service-names-port-numbers/service-names-port-numbers.xhtml, and therefore the exchanged data frame between the CTPS and the Application is called a Service Data Unit (SDU). The exchanged data frame between the CTPS and the Network CTPS Layer is called a Protocol Data Unit (PDU). FIG. 19 shows an exemplary implementation of on the IP stack 1900 and its architectural components, in particular layer 1903-1905. The CTPS Control Message Protocol block 1906 is responsible for the transport layer control messaging, which includes updates or adjustment of parameters related to links between devices and exchange/update of security keys The Flow Control and re-transmission with PDU assembly/disassembly block 1907 handles the flow control and re-transmission including puts the SDUs in ascending order, if the PDUs have been received out of order before the SDUs are passed on the Application layer. PDU assembly and disassembly is handled by this block. The Authentication, de-/encryption and CRC block 1908 checks or adds the CRC field, authenticates the PDU and encrypts/decrypts the payload field.

Figure 20:
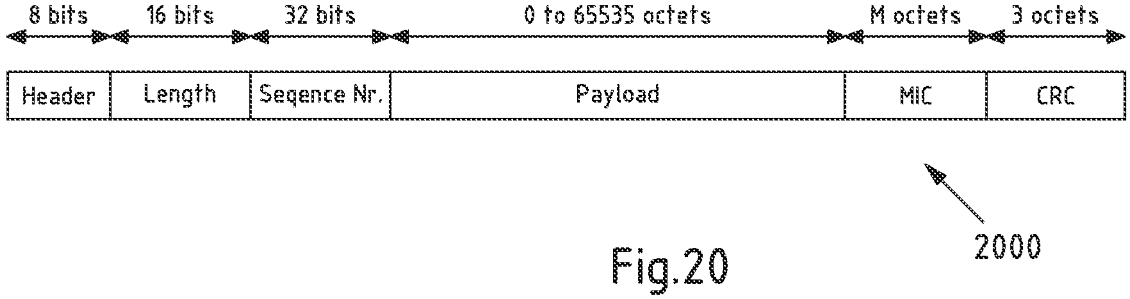
FIG. 20 illustrates a PDU format for CTPS.

The CTPS PDU 2000 is schematically depicted in FIG. 20 and the following table provides a summary of the packet structure.

| Field Name | Octets | Description |
|---|---|---|
| Header | 1 | Header field with control information |
| Length | 2 | Length of the PDU payload |
| Sequence Nr. | 4 | PDU sequence number. For a set of authentication/encryption keys each new PDU shall have a new sequence number. |
| Payload | Up to 65535 | PDU payload |
| MIC | M∈ [4, 6, 8, 10, 12, 14, 16] | Message Integrity Check (MIC). Used for authentication. The length of the MIC field is defined during security update The MIC field shall not be included in an un-encrypted PDU |
| CRC | 3 | Cyclic Redundancy Error (CRC) |

The following table provides header field definitions of the CTPS PDU.

| Field Name | Bits | Description |
|---|---|---|
| Ver | 1 | Indicates the CTPS version |
| EP | 2 | Encrypted PDU (EP). EP ≠ 0b00 indicates that the PDU is encrypted and includes a MIC field. When the encryption keys are changed the value in EP field shall be changed and the new value shall not be 0b00 when encryption is enabled. A change in in EP field value indicates to the peer device that the encryption keys have been changed. EP = 0b00 indicates that the PDU is not encrypted and don't include a MIC field. |

-continued

| Field Name | Bits | Description |
|---|---|---|
| LLM | 1 | Indicated that the payload contains an CTPS Control Message (CM). |
| AF | 1 | Indicates that the payload contains sequence numbers of the PDUs, that have requested to be acknowledged |
| RTX | 1 | Indicates that the payload contains re-transmitted PDUs |
| ARQ | 1 | Acknowledgement of the this PDU is requested to the receiver by the sender. |
| (RFU) | 1 | Reserved for Further Use |

Figure 21:
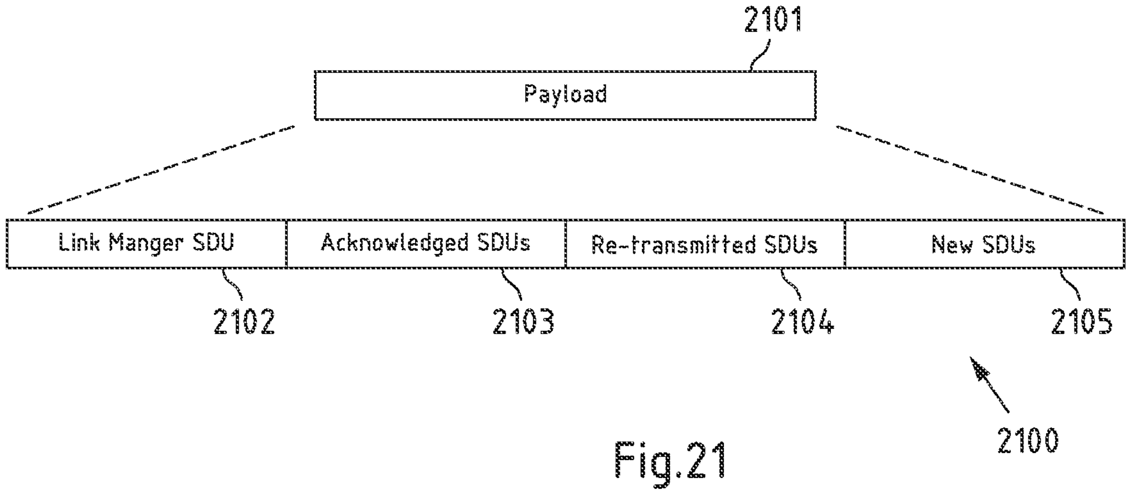
FIG. 21 illustrates a payload format for CTPS.

FIG. 21 depicts an exemplary sequence 2100 of four types of frames in the PDU payload 2101: CTPS Control message SDU 2102, Acknowledged SDUs frame 2103, Re-transmitted SDUs frame 2104 and New SDUs frame 2105. The header bits AF and RTX indicate whether the Acknowledged SDUs frame and Re-transmitted SDUs frame are included respectively. The header bits indicate whether the first 3 types are included in a payload or whether one or more of the three first frame types are absent in a payload.

Figure 22:
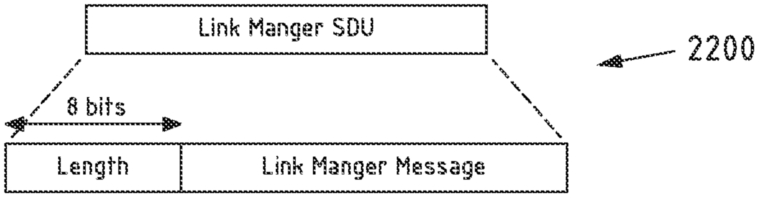
FIG. 22 illustrates a format of the Link Manger SDU for CTPS.

FIG. 22 schematically depicts the format of the CTPS Control Message SDU 2200 part of the payload. The first octet field "Length" indicates the length of the CTPS Control Message.

Figure 23:
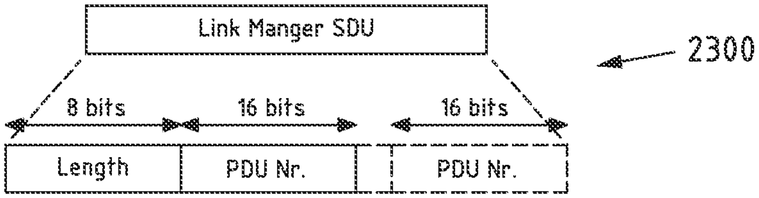
FIG. 23 illustrates a format of the Acknowledged PDU(s) frame for CTPS.

FIG. 23 schematically depicts the format of the acknowledged PDUs part 2300 in the payload. The first two octets "Number" field indicates the number of two octet PDU Nr frames, which contain the lower 16-bits of sequence number of the PDU being acknowledged.

Figure 24:
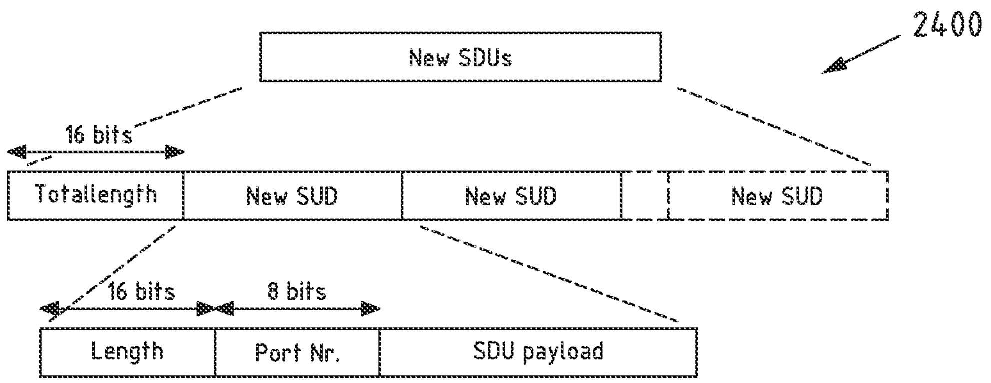
FIG. 24 illustrates a format of a new SDUs frame for CTPS.

FIG. 24 schematically depicts the format of the New SDUs frame 2400 in the payload. The first two octets "Total length" field indicates in octets the total length of all the New SDU frames. The SDU frame begins with a two octets "length" field, which indicated the length of the SDU payload in octets. The next field is one octet "Port Nr.", which is the port number of the application. The port number field could however be extended to e.g. 2 octets, whereby the TCP and UDP port numbers could be re-used.

Figure 25:
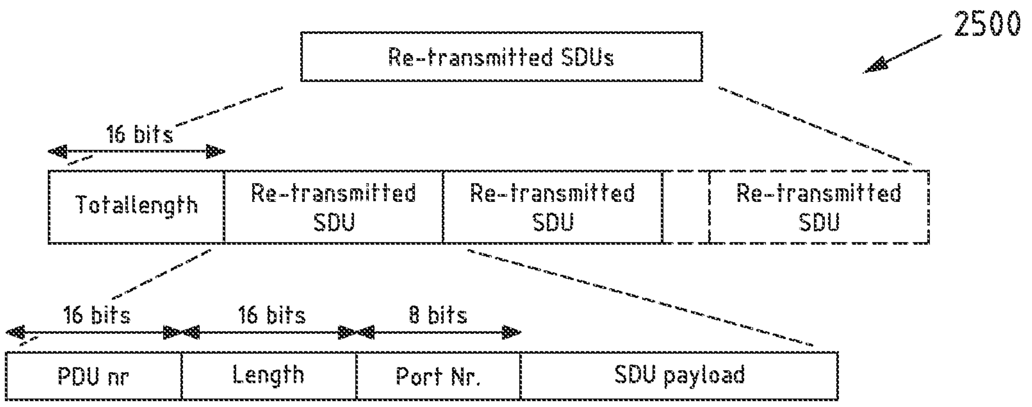
FIG. 25 illustrates a format of a re-transmitted SDUs frame for CTPS.
Figure 26:
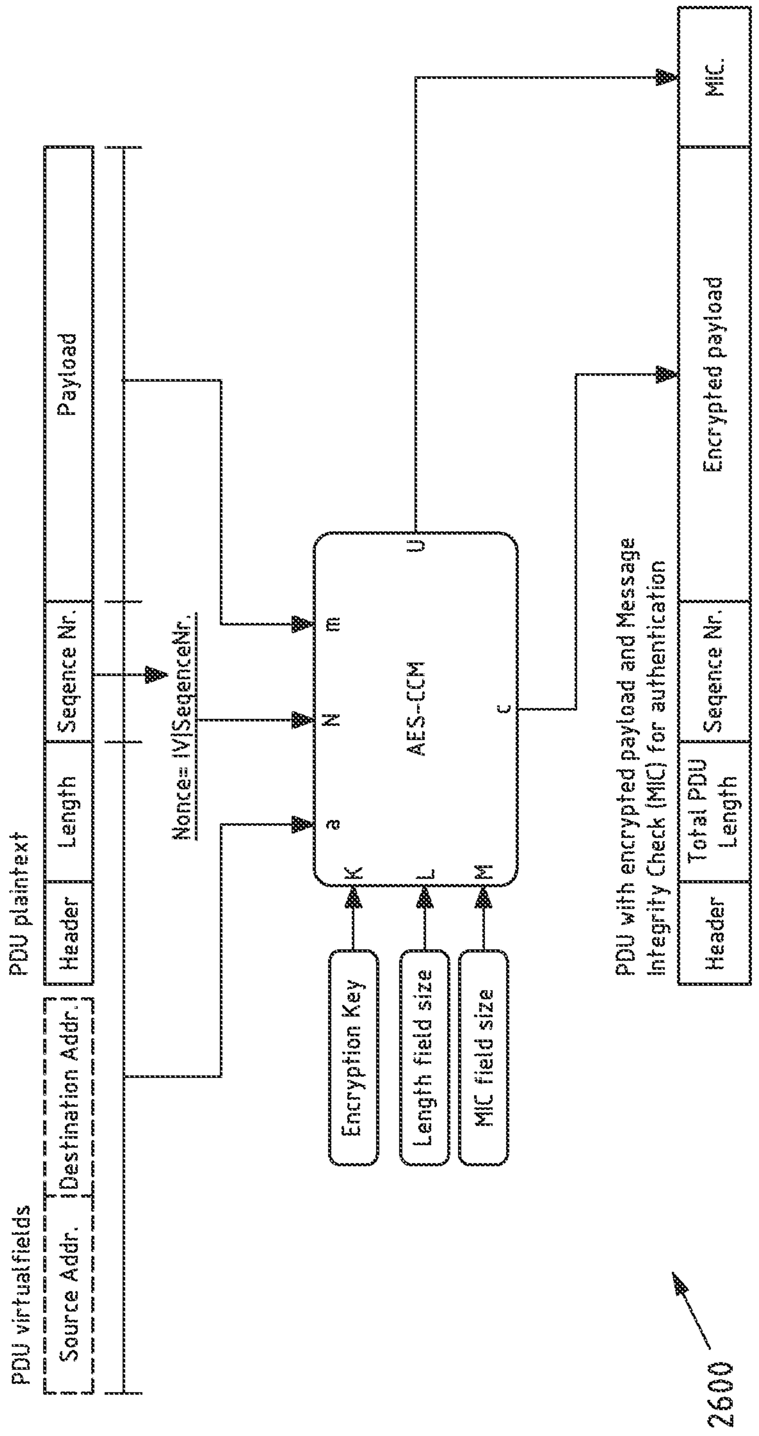
FIG. 26 illustrates an exemplary PDU encryption.

FIG. 25 schematically depicts an example format of the Re-transmitted SDUs 2500 in the payload. The first two octets contain the number of the PDU being retransmitted. The two octets Length field indicates which indicated the length of the SDU payload. The one octet Port Nr. is the port number of the application For example, For authenticating the PDU and encrypting the PDU payload the 128 bits AES (Advanced Encryption Standard) and CCM (Counter Mode Cypher Block Chaining Message Authentication Code) may be used, which is illustrated in diagram 2600 of FIG. 26 and which inputs and outputs are provided in below table. An 256 bits AES may be used.

TABLE 2-6

Description of the in- and out-put of the AES-CCM block.

| AES-CCM Inputs/outputs | Description |
|---|---|
| K | 128-bits encryption key, which is known by both the sender and receiver. |
| L | Number of octets in the length field - here 2 |
| M | Number in the octets in the MIC field (used for authentication) - Defined during negotiation or update of the security keys. |
| a | Additional authenticated data. Here it consists of a virtual part, which is the 128-bits IPv6 source address and the 128-bit IPv6 destination address plus the PDU Header field and the Total PDU length field. |
| N | The 15-L = 13 octets nonce. Here the nonce is a concatenation of the 4 octets PDU sequence number (Sequence Nr) and an Initialization Vector (IV), which is known by both the sender and receiver. I.e. nonce = IV\|Sequence Nr |
| m | Message to authenticate and encrypt. Here the PDU payload |
| c | Cypher or encrypted payload field |
| U | Authentication value or the PDU MIC field |
| IV | The Initialization Vector (IV) is defined during negotiation or update of the security keys. The size in is: 15-L-number of octets in the Sequence Nr Field = 15-2-4 = 9 octets. |

Further details of the AES-CCM block can for instance be found in Counter with CBC-MAC under https://tools.ietf.org/html/rfc3610.

Figure 27:
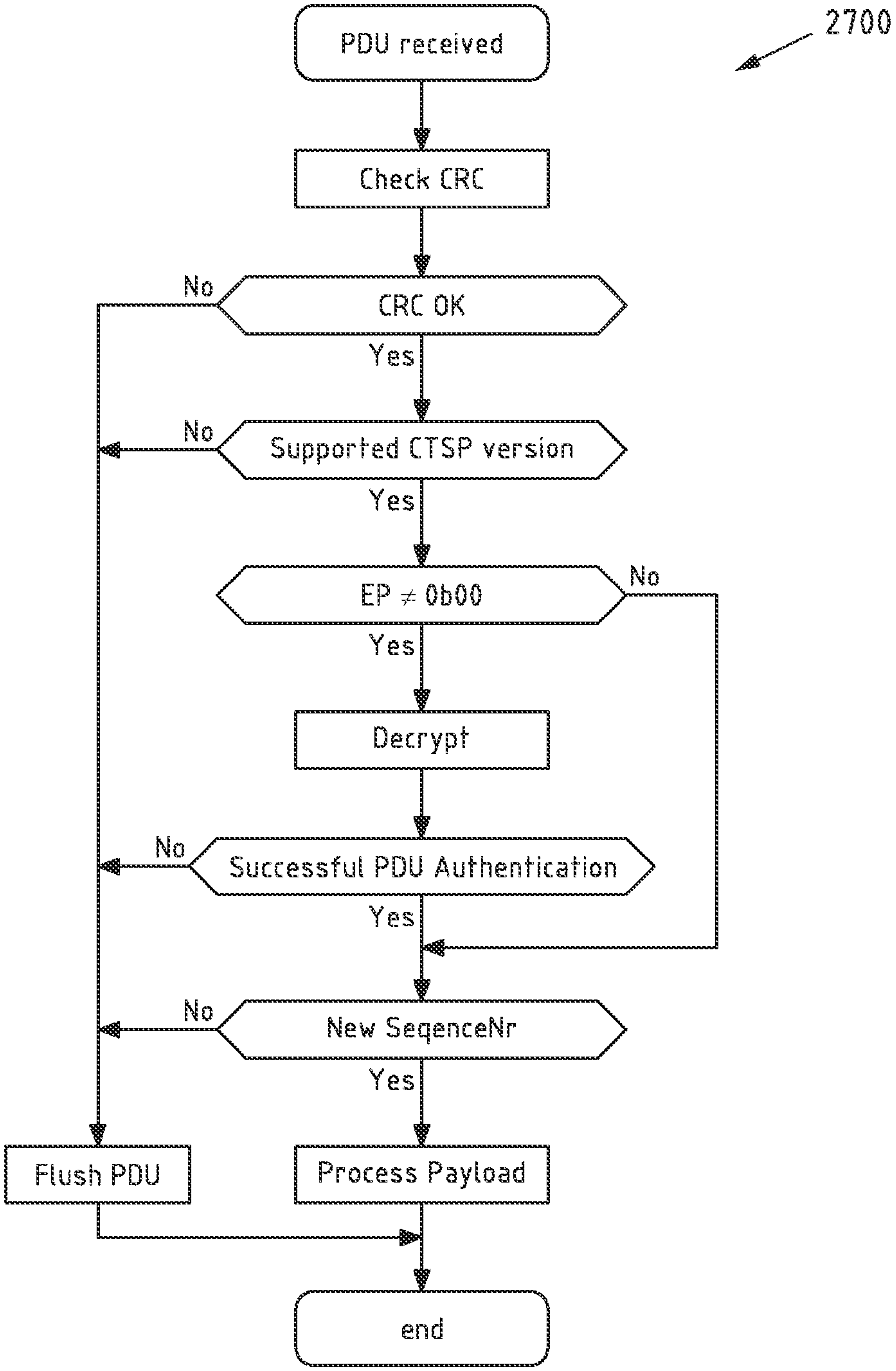
FIG. 27 illustrates a flow diagram when receiving an encrypted PDU.
Figure 28:
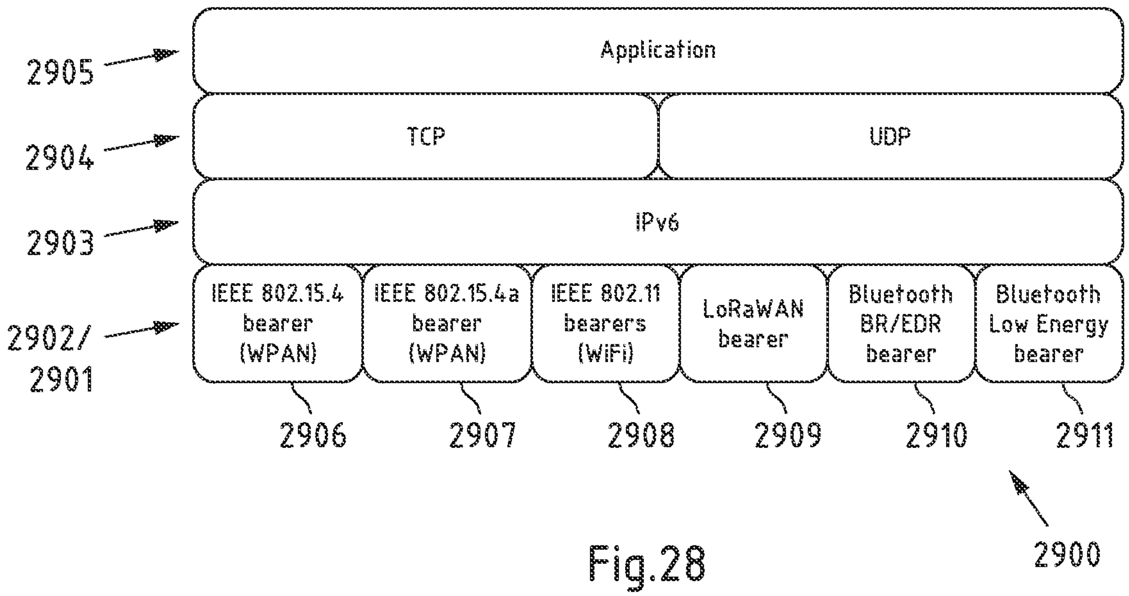
FIG. 28 illustrates a simplified IP stack with multiple exemplary possible transports.

Regarding the PDU reception and transmission, FIGS. 27 and 28 show exemplary flow diagrams 2700, 2800 of receiving and transmitting a PDU, respectively. The encryption process has been described above.

Before data communication can happen, both ends need to agree on e.g. the maximum PDU size, transport interval and/or security keys. This can either happen via configuration at manufacturing or negotiation via the CTPS Control Message Protocol.

The transport interval can be configured with a constant interval, with a constant interval plus additional transmissions, if there is more data to be sent than the maximum PDU size, with a non-constant interval, where a PDU is only transported, if the payload has a defined/agreed size, with a non-constant interval, where a PDU is only transported, if the payload has a defined/agreed size or if there has not been a transmission in a defined period, or with a non-constant interval, where a PDU is transported, if there is a payload.

When acknowledgement is enabled the CTPS will order the received SDU in ascending order before the SDU is passed on the Application(s), which requested a reliable transport—the ordering feature is similar to the feature implemented in TCP. Which transport interval method to use and whether acknowledgment is requested depends on the application protocol in use.

Above, the protocol stack comprising the internet protocol implemented at the hearing aid used the Bluetooth or Bluetooth LE standard for handling and physically transmitting the in IP packets in the layer or sub-layers below internet protocol. However, generally other protocol or standards than Bluetooth may generally also be employed. For instance, instead of or in addition to letting Bluetooth handling the transport of the IP packets in the hearing aid, this handling and transmission could also be realized via the IEEE802.15.4 standard (WPAN), the IEEE802.15.4a standard (UWB), any of the 802.11 family of standards (WiFi) or LoRaWAN for instance. A simplified IP stack 2900 with its layers 2901-2905 and multiple possible bearers 2906-2911 is depicted in FIG. 28.

Figure 29:
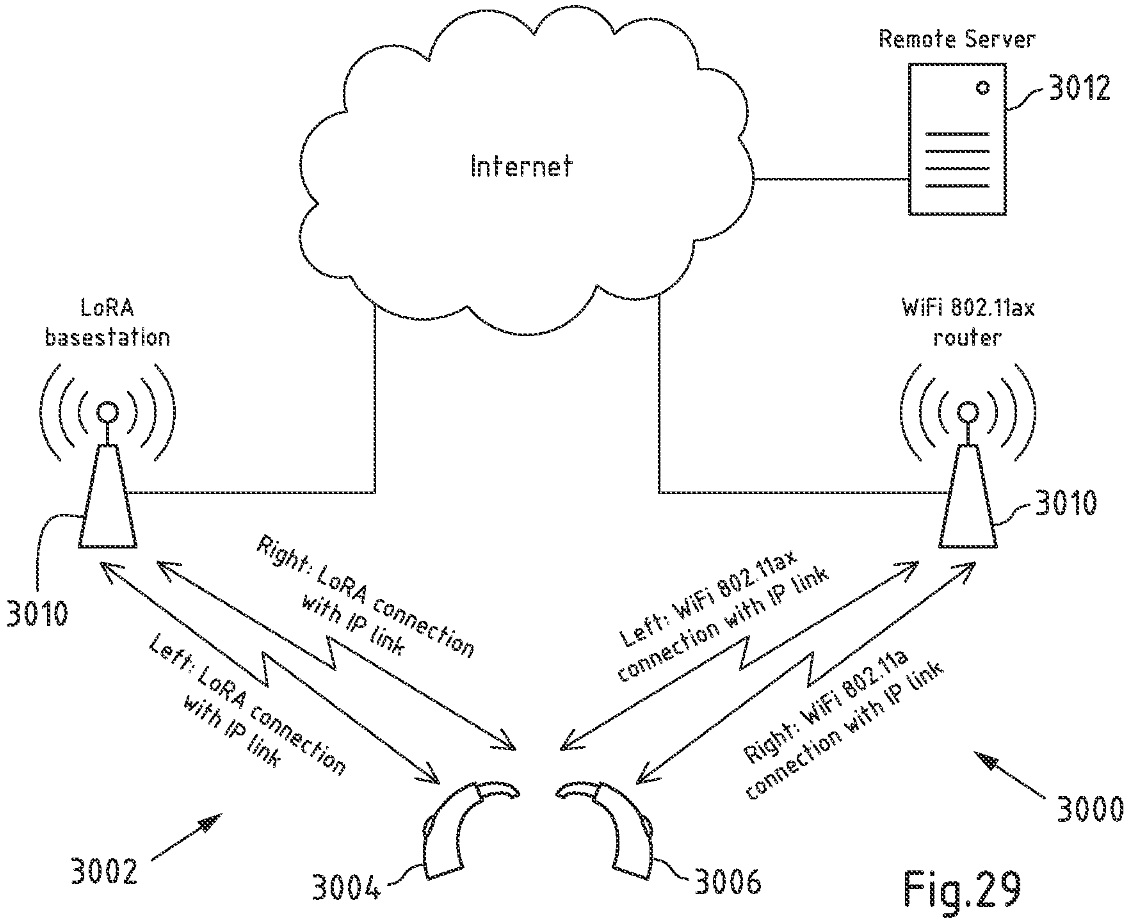
FIG. 29 illustrates an exemplary end to end IP link via LoRA or WiFi 802.11ax transports.

Correspondingly, FIG. 29 depicts an exemplary system 3000 with hearing aid system 3002, hearing aids 3004, 3006, LoRA base station and border router 3010 and remote server 3012. Here, two examples of an IP end to end link via two different transport protocols (either LoRA or WiFi 802.11ax in this case) is illustrated.

It is intended that the structural features of the devices described above, either in the detailed description and/or in the claims, may be combined with steps of the method, when appropriately substituted by a corresponding process.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element, but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method are not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects. Reference to an element in the singular is not intended to mean "one and only one" unless specifically so stated, but rather "one or more." Unless specifically stated otherwise, the term "some" refers to one or more.

Accordingly, the scope should be judged in terms of the claims that follow.

The invention claimed is:

1. A hearing aid system comprising at least a first hearing aid executing a first application, wherein the first hearing aid is configured to establish a communication link over the internet between the first application executed by the first hearing aid and a second application executed by a remote entity, the communication link being established based on a protocol stack, the protocol stack includes a combination of an internet protocol and a Constrained Transport Protocol with Security protocol, and the protocol stack is implemented in the first hearing aid.

2. The hearing aid system according to claim 1, wherein the remote entity is a remote server.

3. The hearing aid system according to claim 1, wherein the Constrained Transport Protocol with Security protocol comprises: a control message protocol block configured to update or adjust parameters related to the communication link between the first hearing aid and the remote entity.

4. The hearing aid system according to claim 1, wherein the Constrained Transport Protocol with Security protocol comprises: a flow control and re-transmission with protocol data unit assembly/disassembly block configured to control flow and re-transmission of service data units and protocol data units.

5. The hearing aid system according to claim 1, wherein the Constrained Transport Protocol with Security protocol comprises: an authentication, decryption/encryption and cyclic redundancy error block.

6. The hearing aid system according to claim 1, wherein the internet protocol is the Internet Protocol Version 4, IPv4, or the Internet Protocol Version 6, IPv6.

7. The hearing aid system according to claim 1, wherein the protocol stack comprises:

an application layer comprising the first application executed by the first hearing aid;

a transport layer comprising the Constrained Transport Protocol with Security protocol, configured for establishing a connection between the first hearing aid and the remote entity;

a network layer comprising the internet protocol, configured for connecting the first hearing aid and the remote entity;

a data link layer, configured for formatting data received or to be transmitted via a physical communication medium; and a physical layer, for transmitting and/or receiving data over a physical communication medium.

8. The hearing aid system according to claim 7, wherein the physical layer of the protocol stack includes a Bluetooth based protocol, and a data link layer of the protocol stack includes a combination of the Bluetooth based protocol and the internet protocol.

9. The hearing aid system according to claim 8, wherein the Bluetooth based protocol is a Bluetooth, a Bluetooth Low Energy (LE) protocol and/or a Bluetooth network encapsulation protocol; and the internet protocol is:

a wireless local area network protocol, WLAN, according to the IEEE 802.11 standards;

a wireless personal area network protocol, WPAN, according to the IEEE 802.15 standards;

a low power wide area network, LPWAN, protocol; or an ultra-wide band protocol, UWB, according to the IEEE802.15.4a standard and/or IEEE 802.11ah standard.

10. The hearing aid system according to claim 1, wherein the first hearing aid is configured for one or more of the following:

receiving a stream of audio from the remote entity over the communication link;

receiving fitting data from the remote entity over the communication link;

receiving firmware updates from the remote entity over the communication link;

transmitting sensor data recorded at the hearing aid system to the remote entity over the communication link;

receiving and/or transmitting optimization data for a neural network over the communication link;

receiving and/or transmitting of IFTTT data over the communication link.

11. The hearing aid system according to claim 1, further comprising at least a second hearing aid, wherein the first hearing aid and the second hearing aid are configured for communicating with one another.

12. The hearing aid system according to claim 11, wherein at least one hearing aid is configured for relaying data received over the communication link from the remote entity to the respective other hearing aid and/or for relaying data received from the respective other hearing aid over the communication link to the remote entity.

13. A system comprising:

the hearing aid system according to claim 1; and the remote entity.

14. The systems according to claim 13, wherein the remote entity is a remote server.

15. The system according to claim 13 further comprising:

a portable or stationary auxiliary device local to the hearing aid system, providing routing functionality for the communication link between the first hearing aid and the remote entity.

16. Method, performed by at least a first hearing aid of a hearing aid system, in particular a hearing aid system according to claim 1, the method comprising:

establishing a communication link over the internet with a remote entity based on a protocol stack, wherein the protocol stack includes a combination of an internet protocol and a Constrained Transport Protocol with Security protocol, and the protocol stack is implemented in the first hearing aid.

17. A non-transitory computer readable storage medium in which computer program code is stored, the computer program code when executed by a processor causing at least one apparatus to perform the method according to claim 16.

18. The hearing aid system according to claim 2, wherein the protocol stack comprises:

an application layer comprising the first application executed by the first hearing aid;

a transport layer comprising the Constrained Transport Protocol with Security protocol, configured for establishing a connection between the first hearing aid and the remote entity;

a network layer comprising the internet protocol, configured for connecting the first hearing aid and the remote entity;

a data link layer, configured for formatting data received or to be transmitted via a physical communication medium; and a physical layer, for transmitting and/or receiving data over a physical communication medium.

19. The hearing aid system according to claim 2, wherein a physical layer of the protocol stack includes a Bluetooth based protocol, and a data link layer of the protocol stack includes the combination of the Bluetooth based protocol and the internet protocol.

20. The hearing aid system according to claim 3, wherein a physical layer of the protocol stack includes a Bluetooth based protocol, and a data link layer of the protocol stack includes the combination of the Bluetooth based protocol and the internet protocol.

* * * * *